(12) United States Patent
Kawamura et al.

(10) Patent No.: US 10,075,804 B1
(45) Date of Patent: Sep. 11, 2018

(54) SOUND PROCESSING SYSTEM, SOUND PROCESSING APPARATUS, STORAGE MEDIUM AND SOUND PROCESSING METHOD

(71) Applicant: NINTENDO CO., LTD., Kyoto (JP)

(72) Inventors: Masafumi Kawamura, Kyoto (JP); Mitsuhiro Hikino, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 15/718,720

(22) Filed: Sep. 28, 2017

(51) Int. Cl.
| H04R 5/02 | (2006.01) |
| H03G 3/00 | (2006.01) |
| H04S 7/00 | (2006.01) |
| H04S 3/00 | (2006.01) |
| A63F 13/25 | (2014.01) |
| A63F 13/54 | (2014.01) |
| H04S 5/00 | (2006.01) |

(52) U.S. Cl.
CPC ............. *H04S 7/303* (2013.01); *A63F 13/25* (2014.09); *A63F 13/54* (2014.09); *H04S 3/008* (2013.01); *H04S 5/005* (2013.01); *H04S 7/302* (2013.01); *H04S 2400/01* (2013.01); *H04S 2400/11* (2013.01); *H04S 2400/13* (2013.01)

(58) Field of Classification Search
CPC .......... A63F 13/25; A63F 13/54; H04S 3/008; H04S 7/303; H04S 2400/01; H04S 2400/11; H04S 2400/13
USPC ........................................................ 381/303
See application file for complete search history.

(56) References Cited

U.S. PATENT DOCUMENTS

| 7,338,373 | B2 * | 3/2008 | Kawamura | ............. A63F 13/10 463/35 |
| 9,226,090 | B1 * | 12/2015 | Norris | ............... H04M 1/72572 |
| 9,282,196 | B1 * | 3/2016 | Norris | ............... H04M 1/72572 |
| 9,674,628 | B1 * | 6/2017 | Norris | ..................... H04S 1/002 |
| 9,769,584 | B1 * | 9/2017 | Norris | ..................... H04S 1/002 |
| 2004/0110561 | A1 * | 6/2004 | Kawamura | ............. A63F 13/10 463/35 |
| 2013/0294618 | A1 * | 11/2013 | Lyubachev | ............. H04S 7/303 381/80 |

(Continued)

*Primary Examiner* — Khai N Nguyen
(74) *Attorney, Agent, or Firm* — Nixon & Vanderhye PC

(57) ABSTRACT

A non-limiting example sound processing system is functioned by a game system that includes a game apparatus, a display device and a plurality of speakers. For example, the plurality of speakers are arranged so as to constitute a surround system. When the game apparatus performs control processing of a game, a game screen is displayed on the display device and a game sound is output from respective speakers. When generating a game sound, a terrain in a virtual space is checked in a grid-like shape within a predetermined range centered on a listener who is located in the virtual space, and a plurality of arrangement position candidates for sound source are set, and a part of arrangement position candidates to be the forefront with respect to the listener are selected from the plurality of arrangement position candidates for sound source. When the sound sources are arranged at the selected some arrangement position candidates, volumes of the plurality of speakers are decided for each of the plurality of sound sources. The volumes of the plurality of speakers decided for each of the sound sources are composed, whereby sound data of the game sound to be reproduced with the plurality of speakers is generated.

23 Claims, 18 Drawing Sheets

(56) References Cited

U.S. PATENT DOCUMENTS

| | | | | |
|---|---|---|---|---|
| 2015/0117650 A1* | 4/2015 | Jo | ............................. | H04S 5/00 381/17 |
| 2015/0264502 A1* | 9/2015 | Aoki | ....................... | H04S 5/005 381/17 |
| 2015/0373477 A1* | 12/2015 | Norris | ..................... | H04S 7/304 381/303 |
| 2016/0080577 A1* | 3/2016 | Norris | ..................... | H04S 7/304 455/412.1 |

* cited by examiner

FIG. 7
GAME SCREEN 200
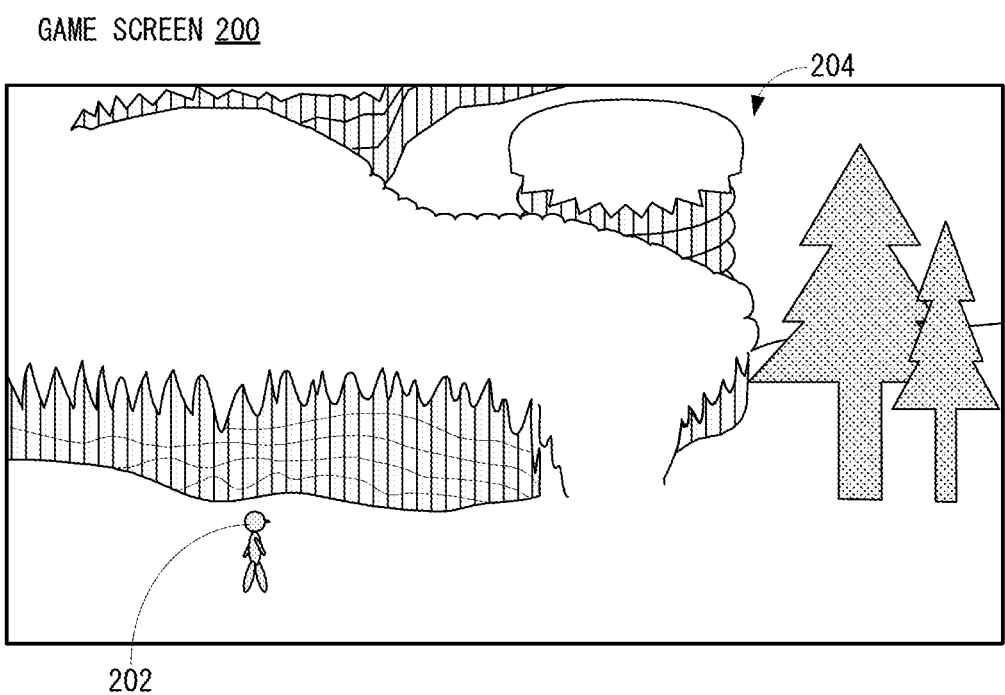
WORLD COORDINATE SYSTEM
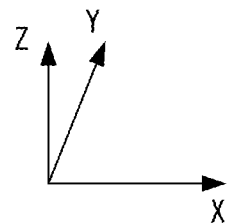

ARRANGEMENT POSITION CANDIDATES FOR SOUND SOURCES

ARRANGEMENT OF SOUND SOURCES

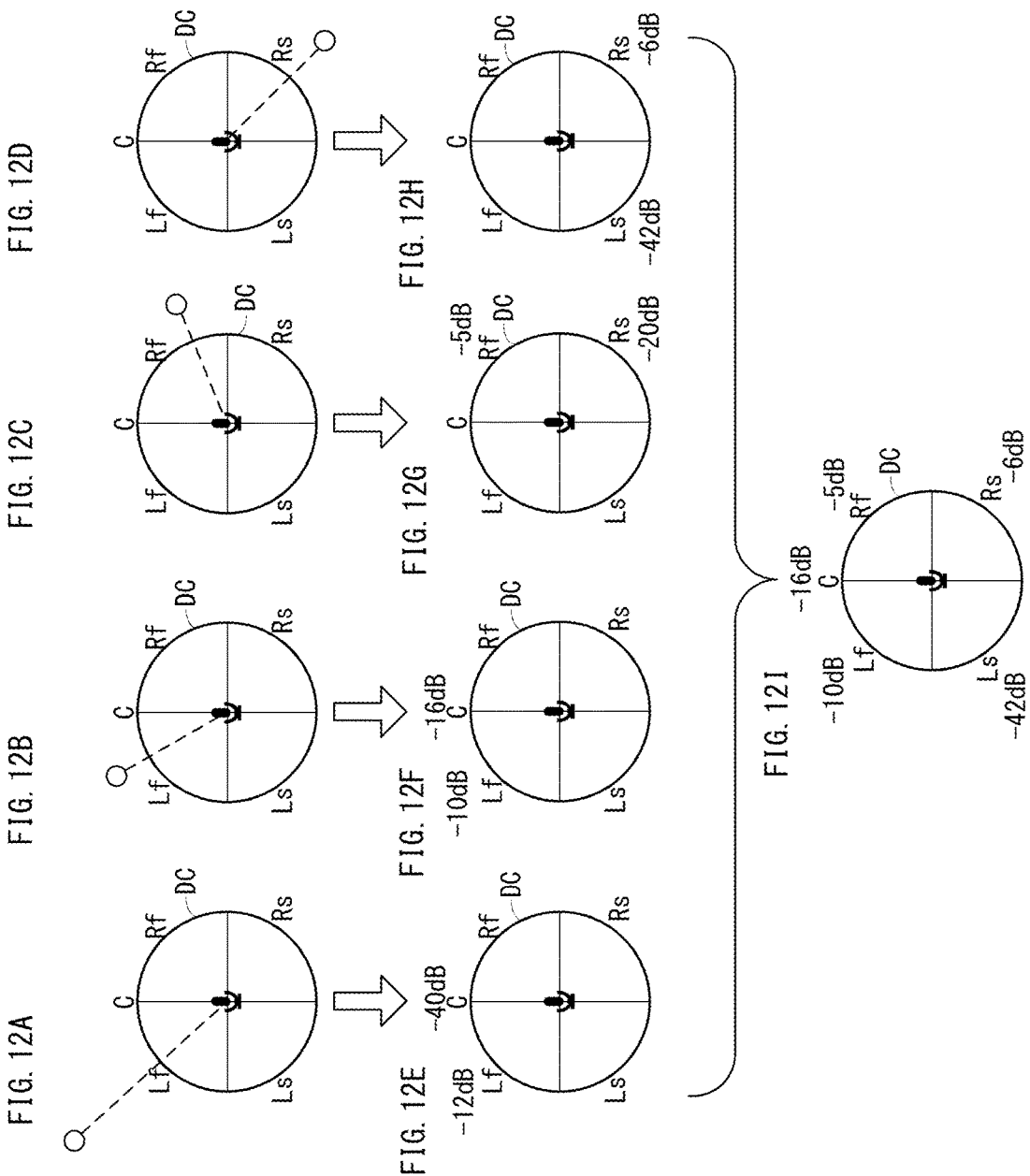

SOUND PROCESSING SYSTEM, SOUND PROCESSING APPARATUS, STORAGE MEDIUM AND SOUND PROCESSING METHOD

FIELD

This application explains a sound processing system, sound processing apparatus, storage medium and sound processing method, which reproduces sounds to be output from virtual sound sources.

SUMMARY

It is a primary object of an embodiment(s) to provide a novel sound processing system, sound processing apparatus, storage medium and sound processing method.

It is another object of the embodiment(s) to provide a sound processing system, sound processing apparatus, storage medium and sound processing method, capable of improving work efficiency.

It is a further object of the embodiment(s) to provide a sound processing system, sound processing apparatus, storage medium and sound processing method, capable of obtaining realistic sound effects.

A first embodiment is a sound processing system, comprising: a listening position control section; a terrain object arranging section; a virtual sound source arranging section; a volume calculation section; and a sound output section. The listening position control section is configured to control, in a virtual space, a position and a direction of a virtual listening point. The terrain object arranging section is configured to arrange a terrain object in the virtual space. The virtual sound source arranging section is configured to arrange a plurality of virtual sound sources within a range that the terrain object satisfies a predetermined condition. The volume calculation section is configured to calculate volumes of sounds to be output to a plurality of sound output destinations, respectively, based on a positional relationship between the plurality of virtual sound sources and the virtual listening point. The sound output section is configured to output sounds to the plurality of sound output destinations with the volumes calculated by the volume calculation section.

According to the first embodiment, since the sound sources are arranged based on the terrain, it is not necessary to set in advance sound sources in the terrain, and therefore, it is possible to improve work efficiency. Moreover, according to the first embodiment, since the volumes are calculated based on the positional relationship between the virtual sound sources and the virtual listening point, it is possible to obtain realistic sound effects.

A second embodiment is the sound processing system according to the first embodiment, wherein the virtual sound source arranging section is configured to set within the range a plurality of arrangement points to which plurality of virtual sound sources are to be arranged, and further to arrange the virtual sound sources on some arrangement points that are selected among the plurality of arrangement points based on distances from the virtual listening points.

According to the second embodiment, the virtual sound sources can be arranged appropriately.

A third embodiment is the sound processing system according to the second embodiment, wherein the virtual sound source arranging section is configured to set within the range the arrangement points for every predetermined interval, and to select the some arrangement points being a nearest side viewed from the virtual listening point out of the arrangement points.

According to the third embodiment, since the arrangement points for arranging the sound sources are set for every predetermined interval, by appropriately setting the range and the predetermined interval, it is possible to avoid that a calculation amount for determining the sound sources to be arranged becomes enormous.

A fourth embodiment is the sound processing system according to the third embodiment, wherein the virtual sound sources include different kinds of virtual sound sources. The virtual sound source arranging section is configured to set for each kind a plurality of arrangement points for arranging a plurality of virtual sound sources within the range, and further to arrange the virtual sound sources at some arrangement points selected among the plurality of arrangement points based on distances from the virtual listening points.

According to the fourth embodiment, it is possible to set the volumes appropriately for each kind of the sound sources.

A fifth embodiment is the sound processing system according to the third embodiment, wherein the volume calculation section is configured to calculate the volume of the sound that is output from the virtual sound source with respect to the plurality of sound output destinations according to the distances between the virtual sound sources and the plurality of sound output destinations while making the direction to the virtual listening point associate with each of the plurality of sound output destinations, and further to select a largest volume component out of calculated sounds that are output from the virtual sound sources for each of the plurality of sound output destinations. The sound output section is configured to output the sound to the respective sound output destinations with the largest volume component being selected.

According to the fifth embodiment, the volumes of the sounds output from the virtual sound sources can be combined with each other, thereby outputting the sound with the combined volumes.

A sixth embodiment is the sound processing system according to the first embodiment, further comprising a fixed azimuth sound source arranging section configured to arrange a virtual sound source whose azimuth is fixed at a position with a predetermined distance from a position of the virtual listening point toward a predetermined azimuth within the virtual space, wherein the volume calculation section is configured to calculate, for the virtual sound source whose azimuth is fixed, a volume of a sound according to distances with the plurality of sound output destinations corresponding to the directions with respect to the virtual listening point in the predetermined azimuth. The sound output section is configured to output the sounds that are output from the virtual sound sources arranged within the range and a sound that is output from the virtual sound source whose azimuth is fixed.

According to the sixth embodiment, since the virtual sound source whose azimuth is fixed is arranged, it is possible to further increase the sound effects by outputting not only the sounds based on the terrain but the sound from a predetermined azimuth.

A seventh embodiment is the sound processing system according to the first embodiment, wherein the sound output section is configured to output the sound associated with a kind of the terrain.

According to the seventh embodiment, it is possible to output an environmental sound based on the terrain.

An eighth embodiment is the sound processing system according to the first embodiment, further comprising a player character control section configured to control a player character in the virtual space based on an operation of a user. The listening position control section is configured to the position and the direction of the virtual listening point in conjunction with a position and a direction of the player character.

According to the eighth embodiment, it is possible to obtain a feeling of devotion to the virtual space by, for example, listening the sound audible to the player character in the virtual space.

A ninth embodiment is a sound processing apparatus, comprising: a listening position control section configured to control, in a virtual space, a position and a direction of a virtual listening point; a terrain object arranging section configured to arrange a terrain object in the virtual space; a virtual sound source arranging section configured to arrange a plurality of virtual sound sources within a range that the terrain object satisfies a predetermined condition; a volume calculation section configured to calculate volumes of sounds to be output to a plurality of sound output destinations, respectively, based on a positional relationship between the plurality of virtual sound sources and the virtual listening point; and a sound output section configured to output sounds to the plurality of sound output destinations with the volumes calculated by the volume calculation section.

A tenth embodiment is a non-transitory computer-readable storage medium storing a sound processing program executable by a computer, wherein the sound processing program causes one or more processors of the computer to perform: a listening position controlling step configured to control, in a virtual space, a position and a direction of a virtual listening point; a terrain object arranging step configured to arrange a terrain object in the virtual space; a virtual sound source arranging step configured to arrange a plurality of virtual sound sources within a range that the terrain object satisfies a predetermined condition; a volume calculation step configured to calculate volumes of sounds to be output to a plurality of sound output destinations, respectively, based on a positional relationship between the plurality of virtual sound sources and the virtual listening point; and a sound output step configured to output sounds to the plurality of sound output destinations with the volumes calculated by the volume calculation step.

An eleventh embodiment is a sound processing method, comprising steps of: (a) controlling, in a virtual space, a position and a direction of a virtual listening point; (b) arranging a terrain object in the virtual space; (c) arranging a plurality of virtual sound sources within a range that the terrain object satisfies a predetermined condition; (d) calculating volumes of sounds to be output to a plurality of sound output destinations, respectively, based on a positional relationship between the plurality of virtual sound sources and the virtual listening point; and (e) outputting sounds to the plurality of sound output destinations with the volumes calculated in the step (d).

According to any one of the ninth to eleventh embodiments, as similar to the first embodiment, since the sound sources are arranged based on the terrain, it is not necessary to set in advance sound sources in the terrain, and therefore, it is possible to improve work efficiency.

Moreover, like the first embodiment, since the volumes are calculated based on the positional relationship between the virtual sound sources and the virtual listening point, it is possible to obtain realistic sound effects.

The above described objects and other objects, features, aspects and advantages of the embodiments will become more apparent from the following detailed description when taken in conjunction with the accompanying drawings.

BRIEF DESCRIPTION OF THE DRAWINGS

FIG. 7 is an illustration view showing a non-limiting example game screen.

FIG. 12A is an illustration view showing a non-limiting example positional relationship between each speaker and a listener and a non-limiting example positional relationship between a certain sound source and each speaker, FIG. 12B is an illustration view showing a non-limiting example positional relationship between each speaker and a listener and a non-limiting example positional relationship between another sound source and each speaker, FIG. 12C is an illustration view showing a non-limiting example positional relationship between each speaker and a listener and a non-limiting example positional relationship between a further sound source and each speaker, FIG. 12D is an illustration view showing a non-limiting example positional relationship between each speaker and a listener and a non-limiting example positional relationship between a still further sound source and each speaker, FIG. 12E is an illustration view showing a non-limiting volume when outputting a sound the sound source shown in FIG. 12A outputs from each speaker, FIG. 12F is an illustration view showing a non-limiting volume when outputting a sound the sound source shown in FIG. 12B outputs from each speaker, FIG. 12G is an illustration view showing a non-limiting volume when outputting a sound the sound source shown in FIG. 12C outputs from each speaker, FIG. 12H is an illustration view showing a non-limiting volume when outputting a sound the sound source shown in FIG. 12D outputs from each speaker, and FIG. 12I is an illustration view showing a non-limiting example result obtained by combining volumes of each of the speakers shown in FIG. 12E to FIG. 12H.

DETAILED DESCRIPTION OF NON-LIMITING EXAMPLE EMBODIMENTS

Figure 1:
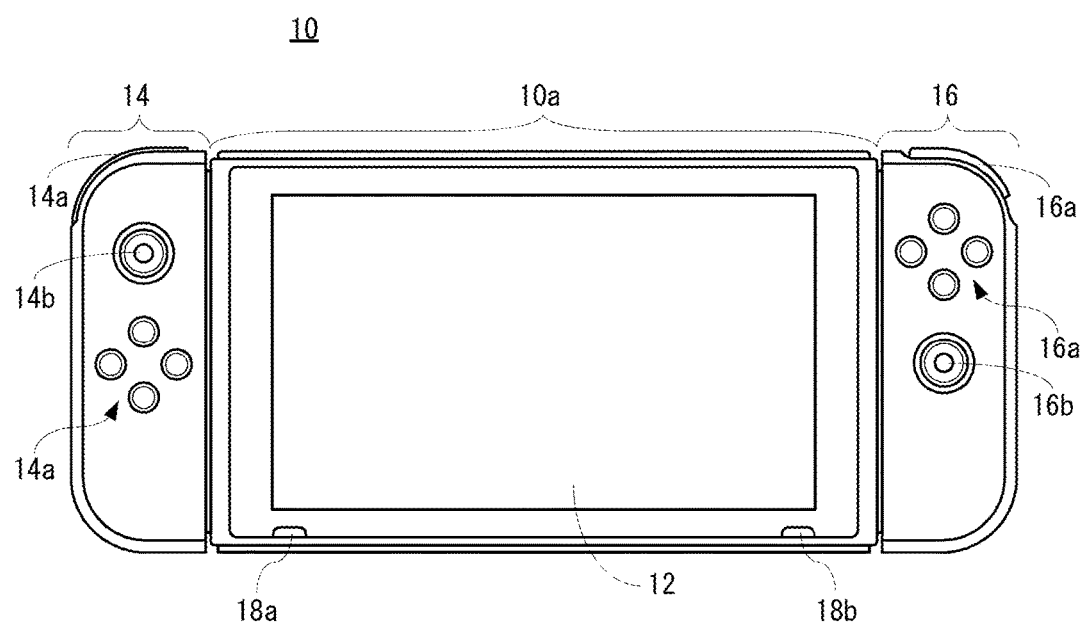
FIG. 1 is an illustration view showing a non-limiting example appearance configuration of a non-limiting example game apparatus.
Figure 2:
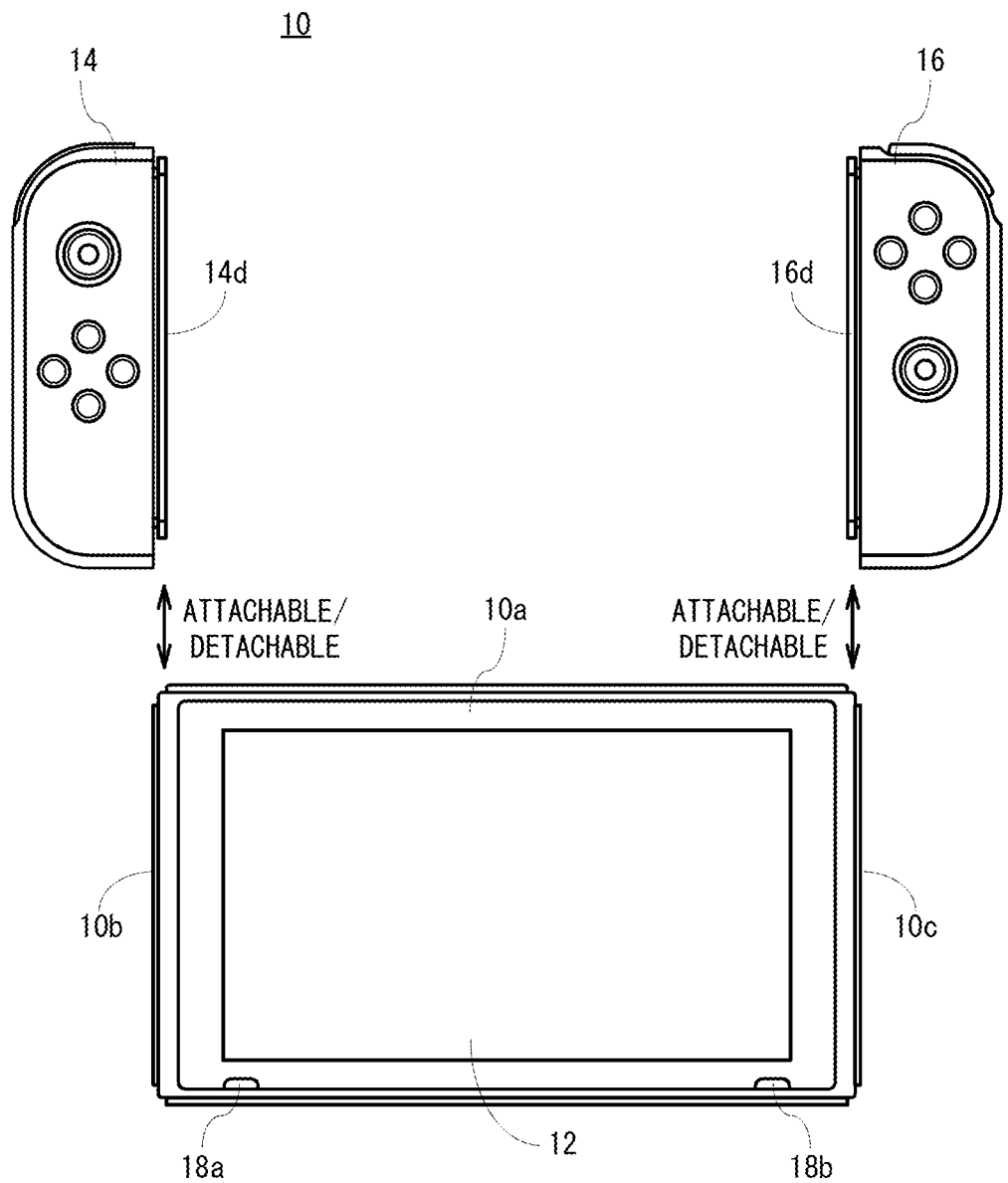
FIG. 2 is an illustration view showing a non-limiting example state dividing the game apparatus shown in FIG. 1 into a non-limiting example main body unit and non-limiting example left and right controllers.

With referring to FIG. 1, a non-limiting example game apparatus 10 includes a main body unit 10a, and the main body unit 10a comprises a display 12. The display 12 is an LCD, but may be a display using an organic EL. Moreover, the game apparatus 10 includes a first controller 14 and a second controller 16, and as shown in FIG. 2, the first controller (left controller) 14 is provided in a left-hand side of the main body unit 10a in an attachable/detachable manner, and the second controller (right controller) 16 is provided in the right-hand side of the main body unit 10a in an attachable/detachable manner.

Moreover, the main body unit 10a comprises speakers (that is, speakers 36a and 36b shown in FIG. 3) in an inside of a housing. There are formed with speaker holes 18a and 18b on a main surface of the housing of the main body unit 10a and beneath a display surface of the display 12. Then, an output sound of the left speaker 36a is emitted from the speaker hole 18a, and an output sound of the right speaker 36b is emitted from the speaker hole 18b.

In addition, although the game apparatus 10 is explained as an example of an information processing apparatus in this embodiment, a smartphone, a tablet terminal, etc. can be used for the main body unit 10a of the game apparatus 10. However, when using a smartphone or a tablet terminal, it is necessary to provide separately structure to or from which the first controller 14 and the second controller 16 are attachable/detachable.

The game apparatus 10 can be used in a state where the first controller 14 and the second controller 16 are attached to the main body unit 10a, or also in a state where the first controller 14 and the second controller 16 are detached (separated) from the main body unit 10a. When the first controller 14 and the second controller 16 are separated from the main body unit 10a, a single player (or user) can use both the first controller 14 and the second controller 16.

In addition, in this embodiment, it is assumed that both the first controller 14 and the second controller 16 are attached to or detached from the main body unit 10a. Moreover, when separating the first controller 14 and the second controller 16 from the main body unit 10a, one of two players can use the first controller 14 and the other player can also use the second controller 16.

Various kinds of operation buttons 14a are provided are provided in the first controller 14 as well as an analog stick 14b. Although detailed description is omitted, the operation buttons 14a and the analog stick 14b can be provided any surfaces of a housing of the first controller 14 other than a surface for being attached to the main body unit 10a. The operation buttons 14a are provided in order to perform instructions according to various kinds of programs executed with the main body unit 10a. The analog stick 14b can designate a direction by tilting. However, instead of the analog stick 14b, a slide stick may be provided. Moreover, the analog stick 14b may function also as an operation button by being depressed. These matters are true for the second controller 16 described later.

As similar to the first controller 14, various kinds of operation buttons 16a are provided are provided in the first controller 16 as well as an analog stick 16b.

Moreover, although illustration is omitted, a connector for connecting with a charge stand 50 is provided on a bottom surface of the main body unit 10a. However, the bottom surface of the main body unit 10a is a surface perpendicular to the display surface of the display 12, and a surface located in a lower side in FIG. 1. For example, when a player uses the game apparatus 10 shown in FIG. 1, the above-described connector turns to a player side.

Furthermore, as shown in FIG. 2, a rail member 10b is provided in a left-hand side surface of the main body unit 10a, and a rail member 10c is provided in a right-hand side surface of the main body unit 10a. On the other hand, a slider 14d is provided in one side surface (right-hand side surface in FIG. 2) of a longitudinal direction of the housing of the first controller 14, and a slider 16d is provided in one side surface (left-hand side surface in FIG. 2) of a longitudinal direction of the housing of the second controller 16.

The rail member 10b is constituted so as to be engageable with the slider 14d, and the rail member 10c is constituted so as to be engageable with the slider 16d. That is, a slide mechanism is formed by the rail member 10b and the slider 14d, and a slide mechanism is formed by the rail member 10c and the slider 16d. Therefore, the first controller 14 and the second controller 16 are slidable to the main body unit 10a and attachable to and detachable form the main body unit 10a.

In addition, a rail member (10b, 10c) may be provided on a controller (14, 16) side and a slider (14d, 16d) may be provided on a main body unit 10a side. Moreover, another mechanism may be adopted as a mechanism for making the first controller 14 and the second controller 16 attachable to or detachable for the main body unit 10a.

Figure 3:
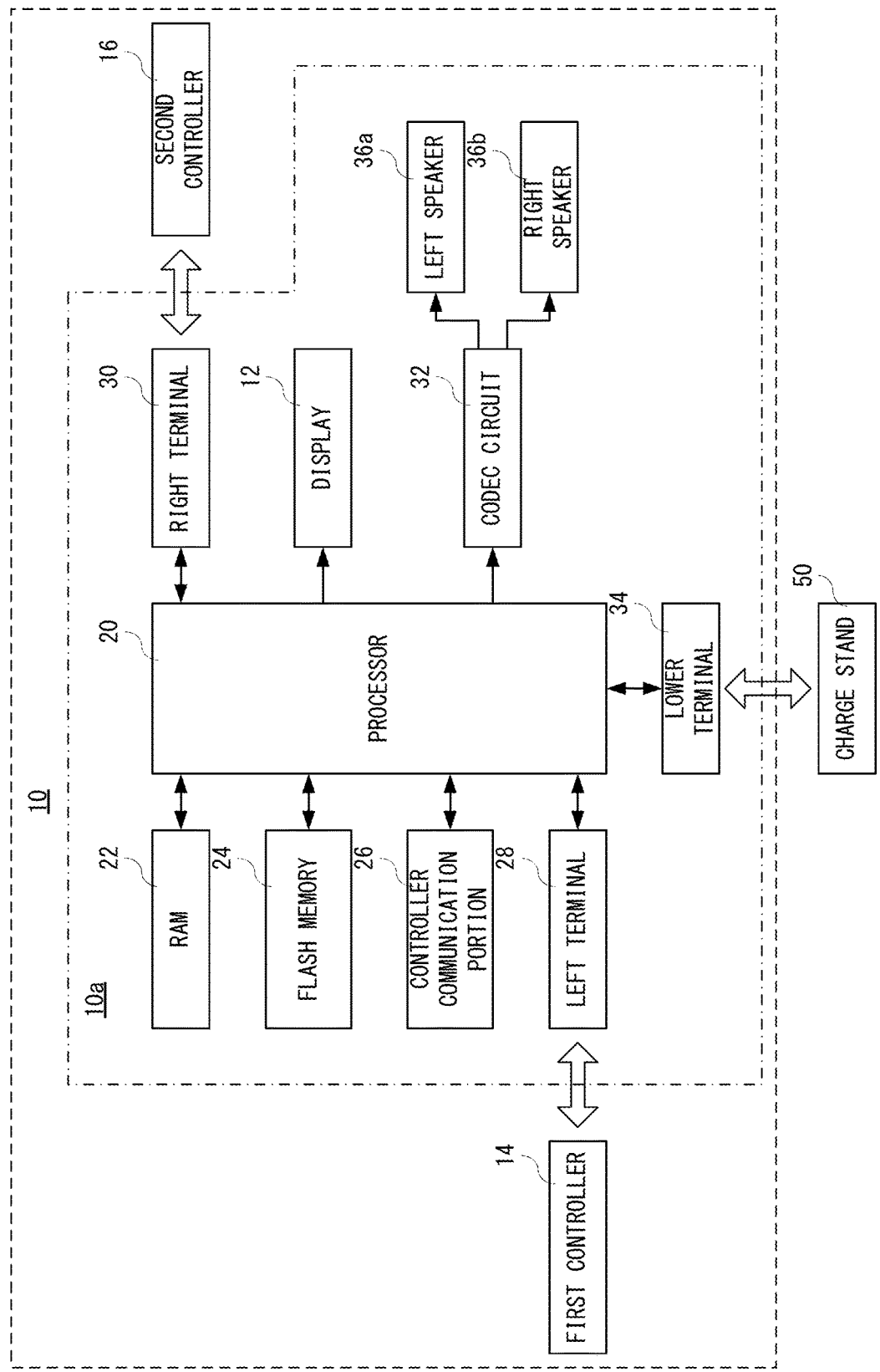
FIG. 3 is a block diagram showing non-limiting example electric structure of the game apparatus shown in FIG. 1.

FIG. 3 is a block diagram showing a non-limiting example electric structure of the game apparatus 10 shown in FIG. 1 and FIG. 2. As shown in FIG. 3, the game apparatus 10 includes a processor 20 and the processor 20 is connected with a RAM 22, a flash memory 24, a controller communication portion 26, a left-hand side terminal 28, a right-hand side terminal 30, a codec circuit 32 and a bottom terminal 34 while being connected to the above-described display 12. Moreover, the codec circuit 32 is connected to a left speaker 36a and a right speaker 36b. These components are provided in an inside of the main body unit 10a. However, connecting portions (contact portions) of the left-hand side terminal 28, the right-hand side terminal 30 and the bottom terminal 34 are provided so as to be exposed from the main body unit 10a.

As described above, the game apparatus 10 includes the first controller 14 and the second controller 16, and when these are attached to the main body unit 10, the first controller 14 is electrically connected to the left-hand side terminal 28 and the second controller 16 is electrically connected to the right-hand side terminal 30.

Moreover, when the game apparatus 10 is put on the charge stand (cradle) 50, the bottom terminal 34 is connected to a connection plug (not shown) provided in the charge stand 50. In this case, electric power is supplied to the game apparatus 10 through the bottom terminal 34 from the charge stand 50, whereby a battery incorporated in the main body unit 10a is charged and batteries incorporated in the first controller 14 and the second controller 16 that are connected to the main body unit 10a are also charged.

However, the charge stand 50 is connectable to a television receiver 60, and in this case, AV (sound and image (video)) data that is output through the bottom terminal 34 from the main body unit 10a is applied to the television receiver 60 through the charge stand 50. Therefore, a game screen is displayed on a display portion (monitor) of the television receiver 60, and a sound (music) is output from a speaker of the television receiver 60. In this case, a monophonic or stereophonic sound is output.

Moreover, as described later, by connecting a plurality of speakers 64 using an AV amplifier 62, a surround system can be constituted. A 5.1ch surround system is constituted by using the five speakers 64 and a subwoofer speaker 64 in this embodiment. In this case, the charge stand 50 is connected to the television receiver 60 through the AV amplifier 62, and each of a plurality of speakers 64 is connected to the AV amplifier 62.

The processor 20 is in charge of whole control of the game apparatus 10. Specifically, the processor 20 is a SoC (System-on-a-chip) that incorporates functions of a processor and a GPU. The RAM 22 is a volatile memory and is used as a working area and a buffer area of the processor 20. The flash memory 24 is a nonvolatile memory and is used for storing various programs (information processing programs) executable on the game apparatus 10, save data, etc.

In addition, although the above-described information processing program is an application program of a game as an example, it does not need to be limited to this. The application program may be a document creation program, an email program, a drawing program, a character practice program, a language training program, a learning program, etc.

In the following, description will be made on a configuration the main body unit 10a performs communication with the first controller 14 and the second controller 16.

In this embodiment, when the first controller 14 and the second controller 16 are in a separate state from the main body unit 10a, the main body unit 10a performs wireless communication with the first controller 14 and the second controller 16. On the other hand, when the main body unit 10a is attached with the first controller 14 and the second controller 16, the main body apparatus 10a performs cable communication with the first controller 14 and the second controller 16.

The controller communication portion 26 performs wireless communication with the first controller 14 and the second controller 16. Although a communication system of the main body unit 10a with the controller (14, 16) can adopt arbitrary systems, in this embodiment, a communication method according to the standard of Bluetooth (registered trademark) is adopted.

The left-hand side terminal 28 is, in case where the first controller 14 is attached to the main body unit 10a, for performing cable-communication between the processor 20 and the first controller 14, and the processor 20 transmits or receives data to or from the first controller 14 via the left-hand side terminal 28. The right-hand side terminal 30 is, in case where the second controller 16 is attached to the main body unit 10a, for performing cable-communication between the processor 20 and the second controller 16, and the processor 20 transmits or receives data to or from the second controller 16 via the right-hand side terminal 30.

Thus, the main body unit 10a can perform cable communication or wireless communication with the first controller 14 and the second controller 16, respectively.

In addition, although illustration is omitted, the left-hand side terminal 28 connects a power line for supplying the electric power from the charge stand 50 to a charge circuit for the battery incorporated in the first controller 14. This is true also to the right-hand side terminal 30.

The processor 20 displays an image generated by execution of information processing and/or an image acquired from an exterior, for example, on the display 12. When information processing is whole game processing, a game image generated through execution of the whole game processing is displayed on the display 12. The codec circuit 32 converts sound data that is output from the processor 20 into an analog sound signal so as to output to the left speaker 36a and the right speaker 36b. For example, the codec circuit 32 outputs a monophonic sound signal to both the left speaker 36a and the right speaker 36b, or outputs a left sound signal to the left speaker 36a and a right sound signal to the right speaker 36b.

However, as described above, in case where a game screen is displayed on the monitor of the television receiver 60 and a sound is output from a speaker of the television receiver 60 or from the plurality of speakers 64 connected to the AV amplifier 62, the processor 20 transmits image (video) data and the sound data (AV data) to the television receiver 60 or the AV amplifier 62 through the bottom terminal 34 and the charge stand 50.

The bottom terminal 34 is a terminal for connecting with the charge stand 50, and is a terminal for connecting an electric power line from a power supply circuit incorporated in the charge stand 50 to a charge circuit for charging the battery incorporated in the game apparatus (main body unit 10a). Moreover, the bottom terminal 34 is also a terminal for performing cable communication with the charge stands 50.

In addition, the electric structure of the game apparatus 10 shown in FIG. 3 is an example, and should not be limited. For example, a touch panel may be provided as an input means. In this case, the touch panel is provided on the display 12. Alternately, a touch display that a touch panel is integrally constituted with the display 12 may be provided. Moreover, an inertia sensor (an acceleration sensor or/and gyro sensor) for detecting a direction (posture) or/and a motion of the game apparatus 10 may be provided.

Figure 4:
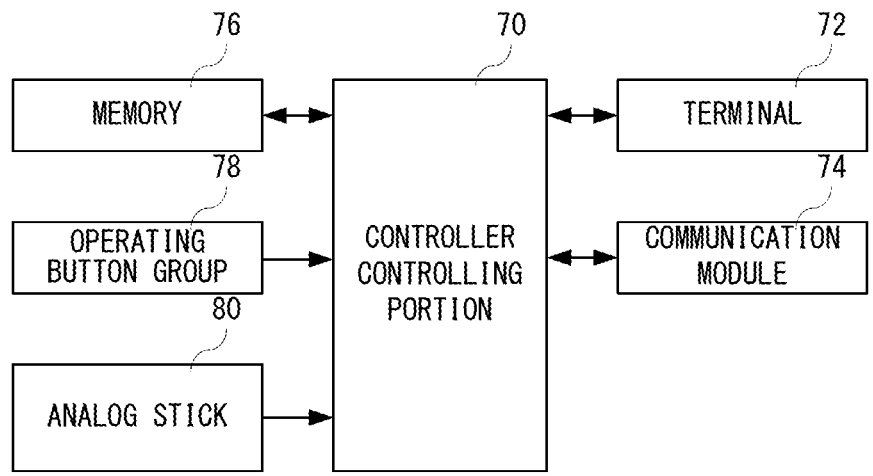
FIG. 4 is a block diagram showing a non-limiting example electric structure of the left controller included in the game apparatus shown in FIG. 1.

FIG. 4 is a block diagram showing non-limiting example electric structure of the first controller 14 shown in FIG. 1 or FIG. 3. As shown in FIG. 4, the first controller 14 includes a controller control portion 70, and the controller control portion 70 is connected with a terminal 72, a communication module 74, a memory 76, an operation button group 78 and an analog stick 80.

The controller control portion 70 is constituted by a microcomputer, for example, and in charge of whole control of the first controller 14. When the first controller 14 is attached to the main body unit 10a, the terminal 72 is provided in order to electrically connect with the left-hand side terminal 28 of the main body unit 10a. When the first controller 14 is separated from the main body apparatus 10a, the communication module 74 is provided in order to connect with the main body unit 10a in a communicable manner. As described above, since the controller communication portion 26 provided in the main body unit 10a adopts a wireless communication system according to the standard of Bluetooth (registered trademark), the communication module 74 also adopts the wireless communication system according to the standard of Bluetooth (registered trademark).

Therefore, when the first controller 14 is attached to the main body unit 10a, the controller control portion 70 receives an operation data of the operation button group 78 or/and the analog stick 80, and outputs the received operation data from the terminal 72. On the other hand, when the first controller 14 is detached from the main body unit 10a, the controller control portion 70 receives the above-described operation data, and transmits the received operation data to the main body unit 10a from the communication module 74.

The memory 76 is a nonvolatile memory such as a flash memory, etc. and stores firmware and identification information of the first controller 14 (controller ID). The controller control portion 70 performs various kinds of processing by performing the firmware stored in the memory 76. Moreover, the controller control portion 70 notifies the controller ID to the main body unit 10a when the first controller 14 is connected to the main body units 10a in a wirelessly communicable manner.

The operation button group 78 is equivalent to various kinds of the above-described operation buttons 14a, and the analog stick 80 is equivalent to the above-described analog stick 14b. Information (operation data) related to an operation performed to the operation button group 78 and the analog stick 80 is repeatedly output to the controller control portion 70 with a predetermined cycle.

In addition, the electric structure of the first controller 14 shown in FIG. 4 is an example, and should not be limited. For example, an inertia sensor (an acceleration sensor or/and gyro sensor) for detecting a direction (posture) or/and a motion of the first controller 14 may be provided. Moreover, a vibrating motor vibrating the first controller 14 may be provided.

Figure 5:
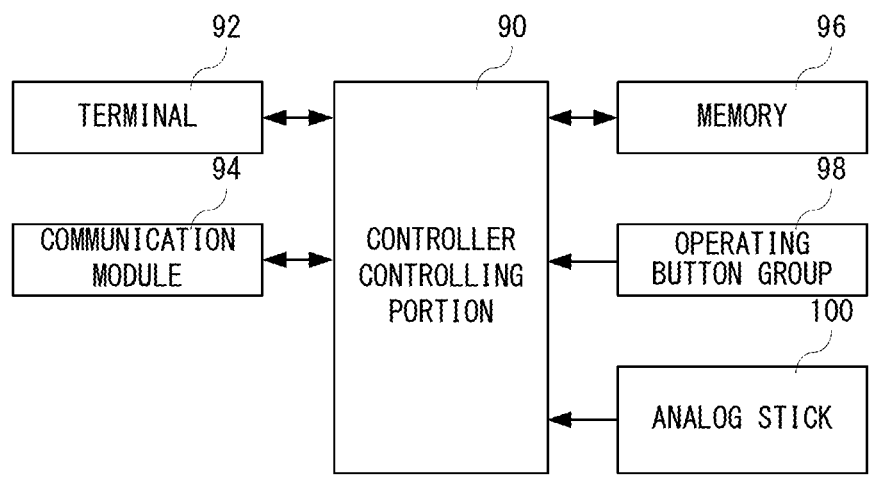
FIG. 5 is a block diagram showing a non-limiting example electric structure of the right controller included in the game apparatus shown in FIG. 1.

FIG. 5 is a block diagram showing a non-limiting example electric structure of the second controller 16 shown in FIG. 1 to FIG. 3. As shown in FIG. 5, the second controller 16 includes a controller control portion 90, and the controller control portion 90 is connected with a terminal 92, a communication module 94, a memory 96, an operation button group 98 and an analog stick 100.

As shown in FIG. 5, since the electric structure of the second controller 16 is the same as the electric structure of the first controller 14 shown in FIG. 4 in this embodiment, description about respective components of the second controller 16 is omitted.

In addition, the first controller 14 and the second controller 16 have the same electric structure in this embodiment, but need not be the same.

Figure 6:
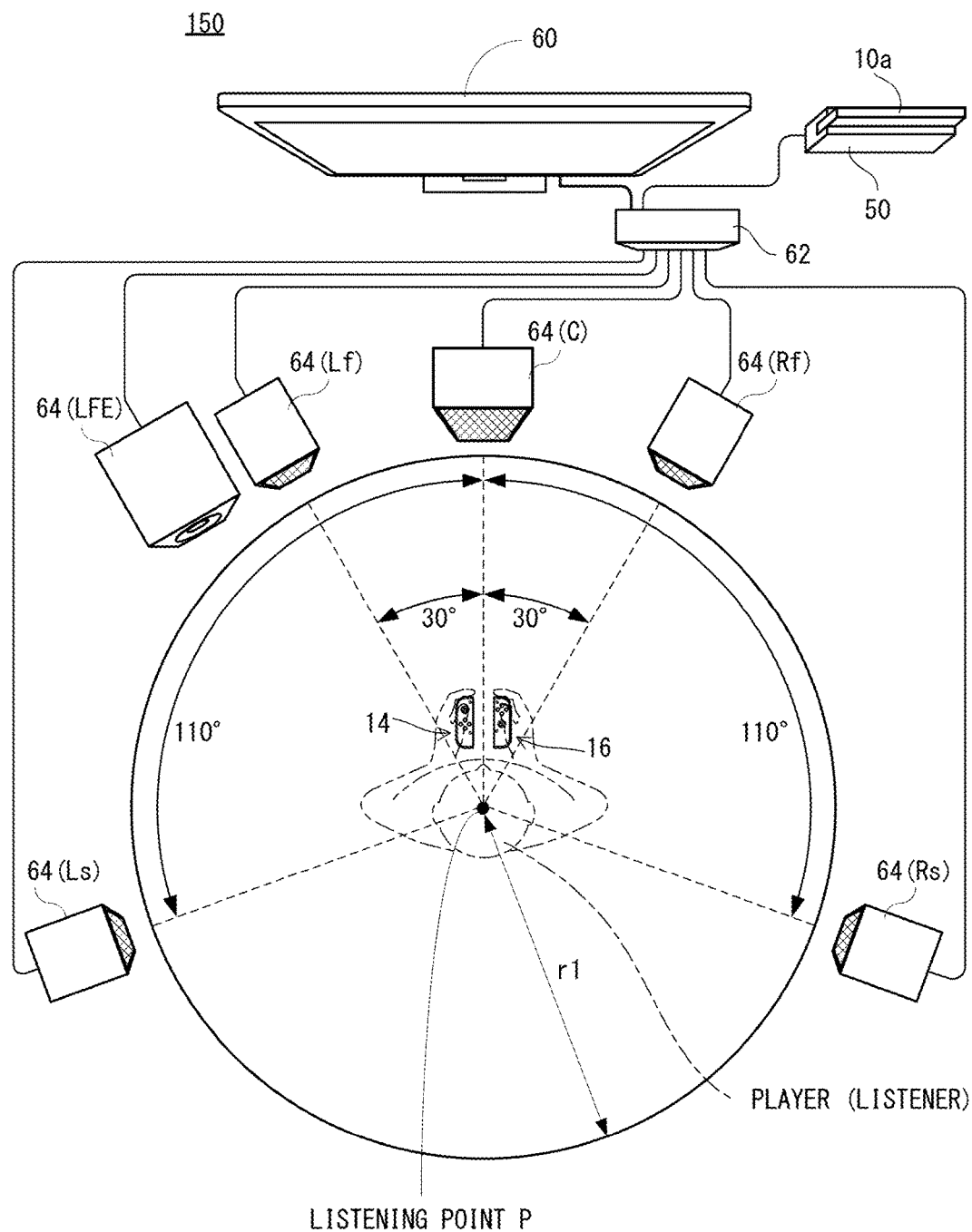
FIG. 6 is an illustration view showing a non-limiting example game system viewed from the above, which comprises the game apparatus shown in FIG. 1.

FIG. 6 is an illustration view a non-limiting example game system 150 of this embodiment, viewed from the above. As shown in FIG. 6, the game system 150 includes the game apparatus 10, and the game apparatus 10 is used in a state where the main body unit 10a, the first controller 14 and the second controller 16 are separated from each other. The game system 150 further includes the charge stand 50, the television receiver 60, the AV amplifier 62 and the plurality of speakers 64, and the charge stand 50 is connected to the television receiver 60 through the AV amplifier 62 using a cable such as an HDMI (registered trademark). The main body unit 10a is put on the charge stand 50 in a communicably manner. Moreover, the plurality of speakers 64 are arranged so as to constitute 5.1ch surround system, and they are connected to the AV amplifier 62 using speaker cables, respectively.

As shown in FIG. 6, the 5.1ch surround system includes five (5) speakers 64a and a subwoofer (speaker) 64b. The five speakers 64a are a center speaker C, a left front speaker (L-front speaker) Lf, a right front speaker (R-front speaker) Rf, a left surround speaker (L-surround speaker) Ls and a right surround speaker (R-surround speaker) Rs. In this embodiment, the five speakers 64a and the subwoofer 64b (LFE) are simply called the "speaker 64" when they do not need to be distinguished, and called the "plurality of speakers 64" when the five speakers 64a and subwoofer 64b are to be collectively, explained. Moreover, the center speaker C, the L-front speaker Lf, the R-front speaker Rf, the L-surround speaker Ls and the R-surround speaker Rs are simply called the "speaker 64a" when there is no necessity of distinguishing, and called the "five speakers 64a" when these speakers C, Lf, Rf, Ls and Rs are to be collectively explained. This is the same also about a case where five virtual speakers 64a are arranged in the virtual space are arranged when generating sound data, as described later.

In the 5.1ch surround system shown in FIG. 6, the five speakers 64a are arranged in deal positions and directions to a player (listener). Specifically, the listener faces the monitor (display surface) of the television receiver 60 at a position distant from the television receiver 60 by a predetermined distance (about 3 to 5 meters). When the listener is viewed from directly above, a middle position between the left and right ears is set to a listening point P. The five speakers 64a are arranged along a circumference of a circle having the predetermined radius r1 with the listening point P as the center. However, the five speakers 64a are turned to the listening point P.

In addition, although the five speakers 64a are arranged in an outside of the circle of the radius r1 in an example shown in FIG. 6, they may be arranged on the circumference of the circle, or may be arranged an inside of the circle. However, the radius r1 is set as a general length (2-3 meters) in case of constituting the 5.1ch surround speaker system.

Moreover, in FIG. 6, the center speaker C is arranged at the front of the listener (0 degree). The L-front speaker Lf is arranged in a direction rotated 30 degrees toward left from the front of the listener. The R-front speaker Rf is arranged in a direction rotated 30 degrees toward right from the front of the listener. The L-surround speaker Ls is arranged in a direction rotated 110 degrees toward left from the front of the listener. The R-surround speaker Rs is arranged in a direction rotated 110 degrees toward right from the front of the listener.

In addition, the subwoofer LFE is arranged in front of the listener and a left-hand side of L-front speaker Lf. However, the subwoofer LFE may be arranged in a direction different from the direction shown in FIG. 6 with respect to the listener as long as near the circle having the radius r1.

Moreover, in the example shown in FIG. 6, the player holds and operates the first controller 14 with the left hand, and holds and operates the second controller 16 with the right hand. If the first controller 14 is operated, operation data from the controller control portion 70 is transmitted from the communication module 74, and received in the controller communication portion 26 to be input to the processor 20. If the second controller 16 is operated, operation data from the controller control portion 90 is transmitted from the communication module 94, and received in the controller communication portion 26 to be input to the processor 20.

In the game system 150, the main body unit 10a performs game control processing based on the operation data from the first controller 14 or/and the second controller 16, and AV data (image data of the game image and sound data of the game sound) generated according to a result that the game control processing is performed is output to the AV amplifier 62 through the bottom terminal 34 and the charge stand 50. That is, the image data is transmitted to the television receiver 60, and the sound data is outputted to each of the plurality of speakers (sound output designations) 64. Therefore, a game screen is displayed on the monitor of the television receiver 60, and a game sound is output from each of the plurality of speakers 64.

FIG. 7 is an illustration view showing a non-limiting example game screen 200 of the virtual game of this embodiment. In this game screen 200, character objects such as a player character 202 and background object 204 are included. Although illustration is omitted in FIG. 7, other character objects such as an enemy character and item objects are also included in the game screen 200 (virtual space).

The player character 202 performs an arbitrary action, such as changing a direction in the virtual space, moving within the virtual space, using the item such as a weapon, etc. in accordance with an operation of the player. Therefore, for example, the player character 202 may fight with the enemy character, and may acquire the item object. Moreover, the enemy character is a non-player character and such a non-player character performs an arbitrary action, such as moving within the virtual space according to control of a computer (processor 20) irrespective of an operation of the player.

The background object 204 is an object arranged in the virtual space, such as a terrain object and a tree object, etc. The terrain object is an object that is arranged in the virtual space and for expressing a surface of the earth in the game map (game field), which is constituted by a number of polygons. Specifically, the terrain object is a terrain object such as the ground (floor, road, grassland, water field, etc.), mountains, valleys, hills, caves, cliffs, walls, stairs, buildings, towns and so on. However, the grassland includes the ground that flowers are planted instead of or in addition to grass. In addition, the water field includes lava (lava flow) as well as ponds, rivers, oceans, muds, lakes, lava (lava flow) and so on.

In addition, as described above, the virtual space of this embodiment is a three-dimensional virtual space and a world coordinate system is set to this virtual space. For example, a two-dimensional plane (horizontal surface) in the virtual space and a position in a horizontal direction are expressed by an X-axis and a Y-axis of the world coordinate system, and a position of a height direction in the virtual space is expressed by a Z-axis of the world coordinate system.

Moreover, in the virtual game, as described above, the game sounds, such as a sound (onomatopoeic sound) of the character object, a BGM, a sound effect, etc. are reproduced according to the result of the game control processing. The sound effect includes not only the sound reproduced (generated) according to an action of the character object or change of a state of the character object but an environmental sound.

The action of the character object or change of a state of the character object corresponds to, for example, that the player character 202 acquires an item, that a level of the player character 202 rises or descends, that the player character 202 attacks the enemy character, that the enemy character attacks the player character 202, etc.

Moreover, the environmental sound is natural sound or artificial sound expressing a wide range scene of the terrain generated based on the terrain in the game world in the virtual space. As the natural sounds, sounds of river water, sounds of waterfalls, sounds of sea waves or lake waves, sound of lava (lava flow), sounds of flames burning, sounds of vegetation in the wind, bugs of insects echoing from grass, etc. correspond. Moreover, as the artificial sound, an iron convection sound of a blast furnace, a driving sound of a belt conveyor of a factory, a traffic noise of a town, and so on can be enumerated. Furthermore, a noise ("base noise" described later) capable of being heard from a predetermined direction (azimuth) is also included in the environmental sound.

In this embodiment, a position of the player character 202 is determined as a position of a virtual listener (listening point P), and a range R in which the environmental sound is heard by the listener is set in the virtual space with the listening point P as a reference (center). In this embodiment, the range R is a square having a side length of a predetermined length (160 meters) and is set on a plane parallel to the horizontal plane.

For example, the range R is centered on the listening point P and defined by two line segments that are parallel to a front-rear direction of the player character 202 and are separated from each other by a predetermined length, and two line segments that are parallel to a left-right direction of the player character 202 and are separated from each other by a predetermined length.

However, in the virtual space, the player character 202 is a character object imitating the human being whose height is 180 centimeters and a direction that a face (body) turns to is the front. In addition, a direction opposite to the front of the player character 202 is the backward direction, and when the player character 202 is facing forward the front, a left-hand side is a left side and a right-hand side is a right side.

Moreover, in another example, the range R may be centered on the listening point P and defined by two line segments that are parallel to the X axis of the world coordinate system and are separated from each other by a predetermined length, and two line segments are parallel to the Y axis of the world coordinate system and are separated from each other by a predetermined length.

Figure 8:
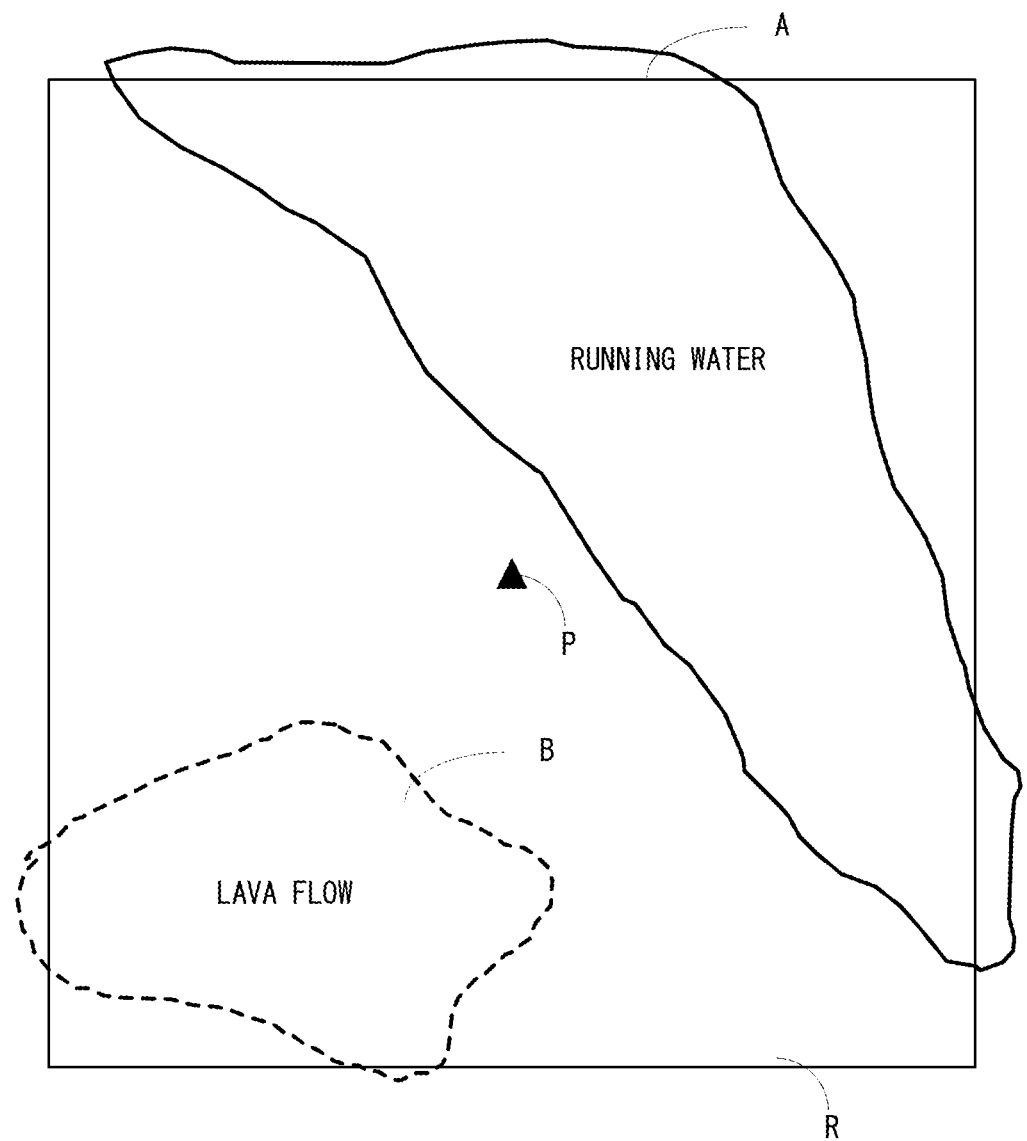
FIG. 8 is an illustration view showing a non-limiting example game map in a virtual game, which being viewed from the above.

FIG. 8 is an illustration view showing a non-limiting example state where the range R is set in a certain scene of the virtual game of this embodiment. In FIG. 8, the range R is indicated by a solid line, but such a solid line is not actually drawn.

In the example shown in FIG. 8, an area A where there is running water and a area B where lava exists are present in the virtual game space, and the player character 202 exists between the area A and the area B. However, it is assumed that the player character 202 faces upward in FIG. 8.

In this embodiment, in the range R, terrain data is checked for each predetermined distance d (for example, 5 meters in the virtual space), and predetermined information included in the terrain data is acquired. In this embodiment, the predetermined information is height of the ground and an attribute of the ground (earth, grassland, water field, etc.). In the case where the ground attribute is grassland, information on grass length (height from the ground) is further included. This is because a kind of sound to be generated dependent on the grass length. Moreover, when the ground attribute is the water field, it also contains information on height of the water surface, a flow velocity and a kind of water (ponds, rivers, oceans, muds, lakes, lava, etc.). This is because a kind of the sound to be generated depending on a situation as to whether the player character 202 is in the water, the flow velocity and the kind of the water field differ.

Figure 9:
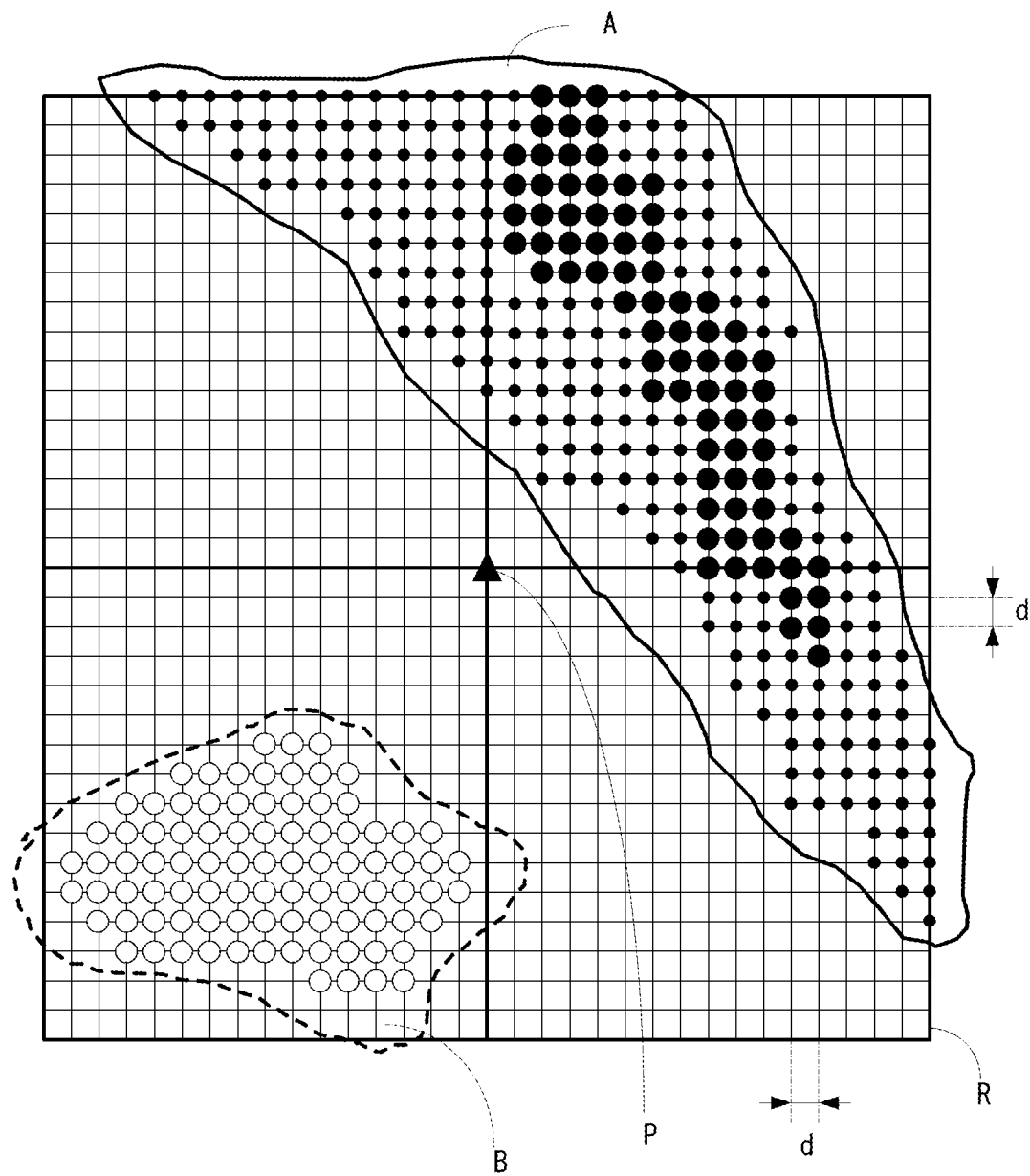
FIG. 9 is an illustration view showing non-limiting example arrangement position candidates for sound source on the game map in the virtual game.

As shown in FIG. 9, the range R is divided into a lattice shape having squares with vertical and horizontal lengths of a predetermined distance d, and the terrain data set at positions corresponding to intersections of vertical and horizontal lines intersecting in a lattice pattern is checked and the predetermined information is acquired. That is, the terrain data is checked in the form of a grid around the listener.

The predetermined distance d is determined to the extent that a check amount of the terrain data does not become too large in the range R.

When predetermined information at each intersection is acquired, it is determined at each intersection whether it is a candidate of a position for reproducing (generating) the environmental sound, that is, a candidate for sound generation point or arrangement position for sound source. Furthermore, when being an arrangement position candidate for sound source is determined, the kind of sound to be generated is further determined. That is, the plurality of arrangement position candidates for sound source are set in the range R.

When the attribute of the ground at a noting position is an attribute that does not generate the environmental sound, the position concerned is not determined as an arrangement position candidate for sound source. On the other hand, when the attribute of the ground at a noting position is an attribute that generates the environmental sound, the position concerned is determined as the arrangement position candidate for sound source.

However, an attribute that is stored with the environmental sound data corresponding to the attribute of the ground is an attribute that generates the environmental sound, and an attribute that is not stored with the environmental sound data corresponding to the attribute of the ground is an attribute that does not generate the environmental sound.

A kind is the sound is determined according to the height of the ground and the attribute of the ground. Basically, the kind of the sound is determined according to the attribute of the ground. However, when the attribute of the ground is a watering place, in addition to the height of the ground, the height of the water surface, the flow velocity and the kind of water is taken into consideration. In addition, the height of the water surface is used in determining water depth. The water depth is a value that the height of the ground is subtracted from the height of the water surface. If the water depth is equal to or more than a predetermined value, it is determined as "There is water that generates environmental sound." Therefore, even if being the watering place, when the water depth is less than the predetermined value, it is determined as "There is no water that generates environmental sound." Therefore, the environmental sound is not generated in a position determined that the water depth is less than the predetermined value. Therefore, there is an occasion that no environmental sound is generated even if the environmental sound data is stored corresponding to the attribute of the ground.

In addition, in this embodiment, basically, the kind of the sound is determined according to the height of the ground and the attribute of the ground, but it does not need to be limited to this.

A sound to be generated may be changed dependent on a positional relationship between the listener and the sound source. For example, since it means that the listener exists underwater when the listener is beneath the sound source of water, it is possible to take a method of switching to "sound heard from the water."

Moreover, if a wall exists between the listener and the sound source, it is also possible to take a method of switching the sound, like "sound before the wall" and "sound beyond the wall (thinned sound being shielded by the wall)."

Moreover, it is acceptable to change the sound to be generated depending on the total number of sound sources. For example, about the sound of a river, it is possible to take a method of switching, like "wide river sound" on the assumption that "water basin is wide" when "there are many sound sources", and "narrow river sound" on the assumption that "water basin is narrow" when "there are few sound sources."

Furthermore, the sound to be generated may be changed according to various elements within the game world, such as the weather, time progress, etc. For example, it is possible to take a method of adding a sound that raindrops hit the surface of a river at the time of rain, mixing a sound of a river that has been increased for a while after the rain, and weakening gradually the sound.

In FIG. 9, a large black dot is indicated at a position of a candidate that generates a sound of the running water having a high flow velocity (for example, river), and a small black dot is indicated at a position of a candidate that generates a sound of a river having a low flow velocity. That is, in the area A of the running water, a region of the running water having a low flow velocity is provided so as to surround a region of the running water having a high flow velocity. Moreover, a large white dot is indicated at a position of a candidate that generates a sound of the lava (lava flow) having a high flow velocity. In the example shown in FIG. 9, the area B of the lava is an area of the lava having a high flow velocity as a whole, and a region of the lava having a low flow velocity is not provided in this area B.

In addition, in FIG. 9, in order to express the difference in sound to be generated, colors and sizes of the painting-out of the dots. In addition, although FIG. 9 shows a dot in order to indicate an arrangement position candidate for sound source, the arrangement position candidate for sound source is merely set, and a sound source is not actually arranged. These matters are true also for a case where the arrangement position candidate for sound source is thinned out as described later.

Moreover, although the square range R is divided in the shape of lattice, and the terrain (terrain data) of the position corresponding to the intersection of the vertical and horizontal lines is checked so as to determine whether that position is to be determined as an arrangement position candidate for sound source, it does not need to be limited to this.

For example, in case where the range R is a circular shape, in the range R, the terrain data at a position corresponding to a point at every predetermined angle as viewed from the listener may be checked in a concentric circle centered on the listener so as to determine whether that position is to be determined as an arrangement position candidate for sound source.

Moreover, in case where the range R is a circular shape, a distance with the listener is gradually lengthened by a predetermined distance in the range R, and the terrain data of a position that a direction is changed by a predetermined angle as viewed from the listener is checked so as to determine whether that position is to be determined as an arrangement position candidate for sound source. That is, the terrain data is checked spirally.

Furthermore, although the square range R is divided in a shape of lattice, and the terrain data of the position corresponding to the intersection of the vertical and horizontal lines is checked in this embodiment, the terrain data at the center position of each polygon constituting the terrain may be checked.

If a plurality of arrangement position candidates for sound source are set, a position that actually generates the environmental sound (position at which the sound source is to be arranged) is selected (determined) from the arrangement position candidates for sound source, and a sound source is arranged at the selected arrangement position. However, each sound source to be arranged generates a sound of the kind determined at the time that the arrangement position candidates for sound source are determined.

As the arrangement position of the sound source, among the plurality of arrangement position candidates for sound source, some arrangement position candidates for sound source become the forefront side viewed from the listener are selected. However, when arrangement position candidates for a plurality of kinds of sound sources are included in the range R, the arrangement position for sound source is selected for each kind from the arrangement position candidates for sound source.

For example, a plurality of virtual straight lines radially extended from the center on the listener are drawn, and an arrangement position candidate for sound source set at a position overlapping with the straight line is selected. Furthermore, when a plurality of the arrangement position candidates for sound source overlap with each other on the same straight line, an arrangement position candidate for sound source nearest to the listener is selected as an arrangement position of a sound source.

Moreover, the plurality of straight lines radially extending are set with an angle with respect to adjacent straight lines at a predetermined angle (for example, 5 degrees). However, the plurality of straight lines radially extending are in parallel to a horizontal plane (XY plane) in the virtual space.

In addition, when the plurality of straight lines radially extending centered on the listener do not overlap with an arrangement position candidate for sound source, the arrangement position candidate for sound source concerned is selected as an arrangement position of a sound source. However, the arrangement position candidate for sound source not overlapping the plurality of straight lines may not be selected as an arrangement position of a sound source.

Moreover, in case where there is a shielding object that shields a sound between the listener and the sound source, an arrangement position candidate for sound source located behind the shielding object when viewed from the listener may not be selected as an arrangement position of a sound source even if it overlaps with any of the straight lines.

Figure 10:
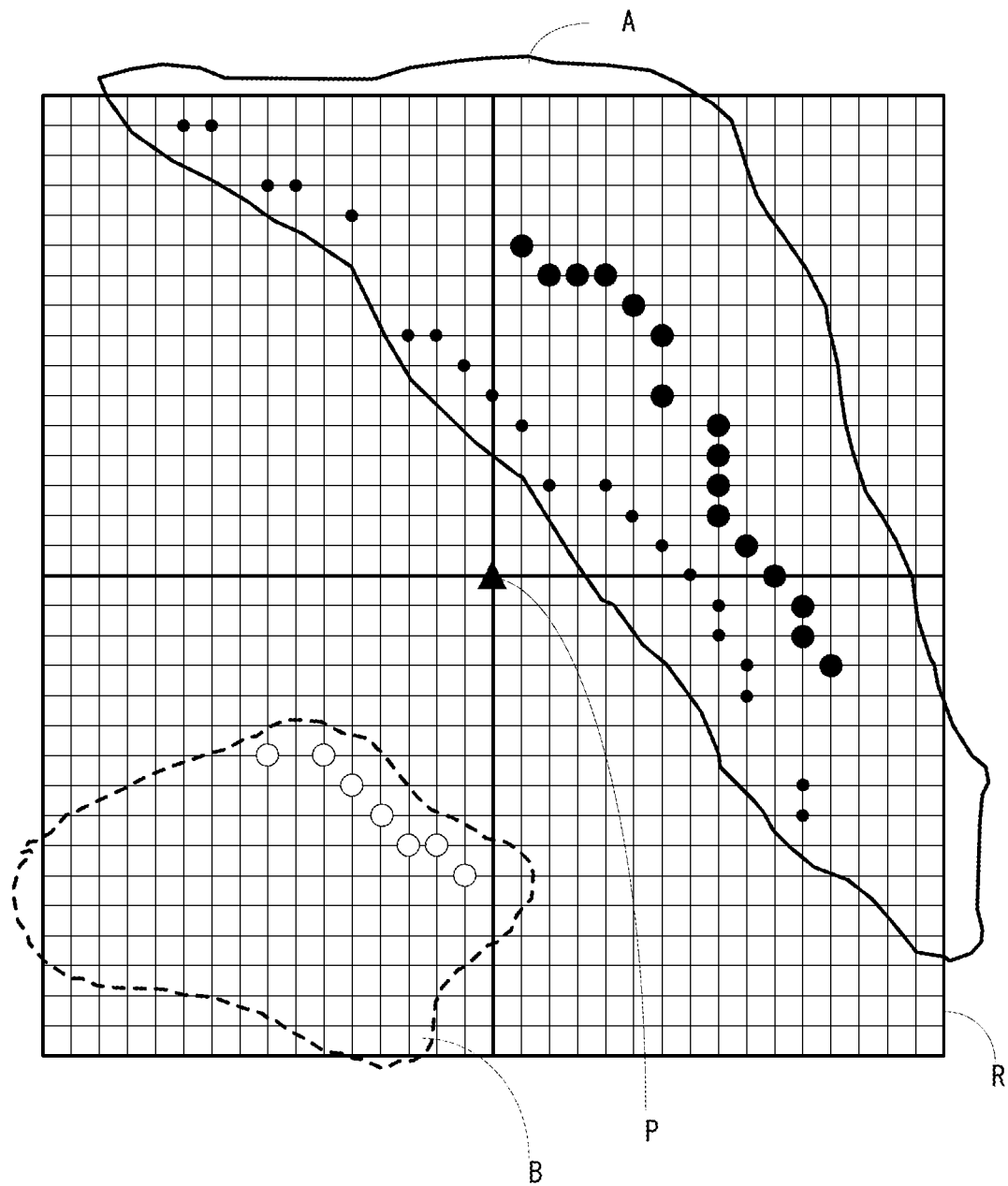
FIG. 10 is an illustration view showing non-limiting example sound sources arranged on the game map in the virtual game.

FIG. 10 is an illustration view showing a non-limiting example state where the sound sources are arranged. As understood by comparing FIG. 9 and FIG. 10, the sound sources are arranged at a plurality of arrangement positions selected from a plurality of arrangement position candidates for sound source. That is, among the plurality of arrangement position candidates for sound source, the arrangement position candidate nearest to the listener is left, and an arrangement position candidate that is hidden behind the remaining candidate is thinned out.

As shown in FIG. 10, about the area A of the running water, a sound source that generates the sound for a river that has a low flow velocity is arranged in a side near to the listener, and a sound source that generates the sound for a river that has a high flow velocity is arranged at a side near the listener out of regions with a high flow velocity. Moreover, about the lava object or area, a sound source that generates the sound for the lava of a high flow velocity is arranged at a side near the listener.

In addition, for the sake of convenience of explanation, it is explained that the sound sources are arranged in this embodiment, but it is not necessary to actually arrange the sound sources in the virtual space since a volume of each of the speakers 64a is calculated on the assumption that the sound source is arranged. The same is applied below.

If the sound sources are arranged at the selected arrangement position, a volume of each of the speakers 64a is calculated for each sound source. Since the 5.1 surround system is constituted, and sounds are output from the speakers 64 in this embodiment, a volume of the sound output from each of the speakers 64 is calculated. However, the subwoofer 64b is used for especially emphasizing heavy bass effects, it does not need to be used for environmental sound. In the following, description will be made on not using the subwoofer 64b in the environmental sound.

Figure 11A:
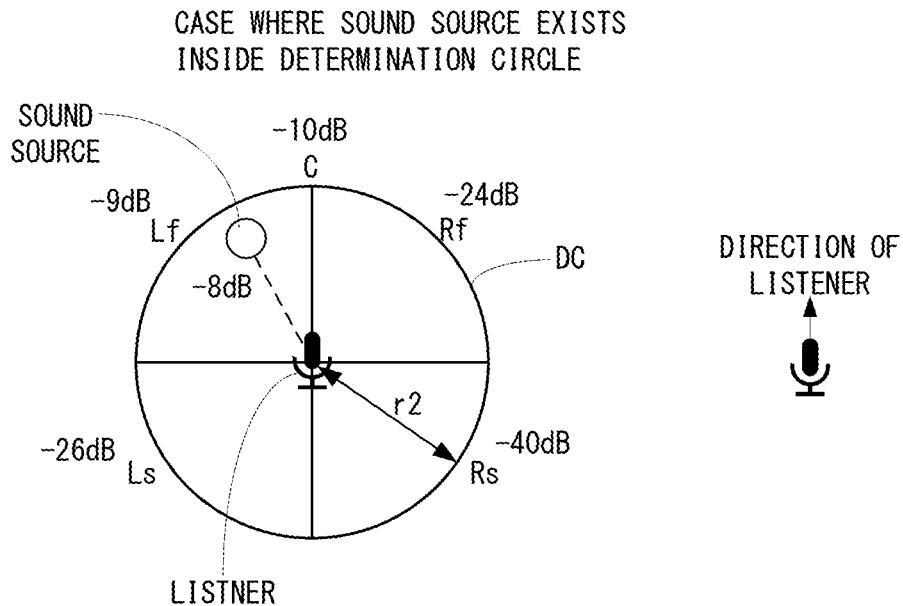
FIG. 11A is an illustration view showing a non-limiting example volume of each speaker in case where a sound source is arranged in a determination circle centering on a position of a listener.
Figure 11B:
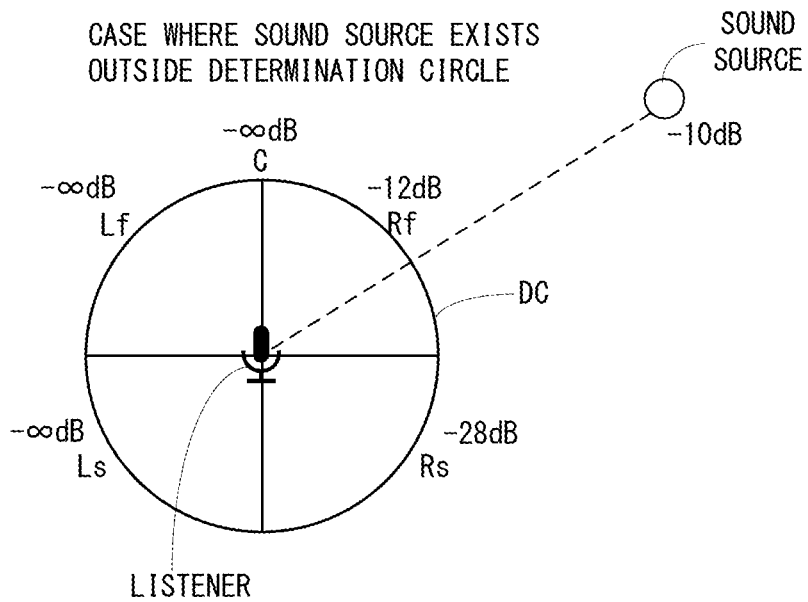
FIG. 11B is an illustration view showing a non-limiting example volume of each speaker in case where a sound source is arranged outside the determination circle centering on a position of a listener.

It is assumed that the five (5) virtual speakers 64a are arranged outside a virtual circle (determination circle) DC centered on a virtual listener (listening point P), and along the determination circle DC. However, a radius of the determination circle DC in the virtual space is set to be longer (8 meters) than a length (5 meters) of each square grid in the area R. In FIG. 11A and FIG. 11B, corresponding to each of positions of the five virtual speakers 64a, alphabetical letters for respectively identifying the five speakers 64a are indicated outside the determination circle DC. However, the five virtual speakers 64a may be arranged on the determination circle DC, or may be arranged inside the determination circle DC along the determination circle DC. Moreover, in FIG. 11A, the listener is indicated by a pattern of a microphone, and as shown in a right-hand side of FIG. 11A, a direction of the listener is an upward direction of the microphone as indicated by an arrow mark. This is true in FIG. 11B, FIG. 12A-FIG. 12D, FIG. 13A and FIG. 13B.

As shown in FIG. 11A, when a sound source exists inside the determination circle DC, that is, when the sound source is arranged in a position comparatively near the listener, a sound of the sound source is reproduced from each of the five speakers 64a. Therefore, the volume of the sound output from the sound source is calculated for each of the five speakers 64a. The volume of the sound that is output from the sound source is attenuated according to a distance between the sound source arranged in the virtual space and the speaker 64a arranged in the virtual space, and in this embodiment, an attenuation amount increases in proportion to the distance. However, the attenuation amount may be increased in proportion to the square of the distance.

In the example shown in FIG. 11A, the volume of the sound that is output from the sound source is −8 dB, and in this case, the volume of the center speaker C is −10 dB, the volume of the L-front speaker Lf is −9 dB, the volume of the R-front speaker Rf is −24 dB, the volume of the L-surround speaker Ls is −26 dB and the volume of the R-surround speaker Rs is −40 dB.

As shown in FIG. 11B, when the sound source exists outside the determination circle DC, that is, when the sound source is arranged in a position away from the listener by a predetermined distance or more, the volume of the sound that is output from the sound source is calculated about two speakers 64a selected among the five speakers 64a. However, the two speakers 64a are selected as follows. Out of the five speakers 64, two speakers 64a that are arranged on both sides across a line segment connecting the listener and the sound source, and with a short distance to the line segment are selected.

In the example shown in FIG. 11B, the R-front speaker Rf and the R-surround speaker Rs are selected. A point that the volume of the sound that is reproduced by the speaker 64a is attenuated in proportion to a distance with the sound source is the same as the above-described case. In the example shown in FIG. 11B, the volume of the sound that is output from the sound source is −10 dB, and in this case, the volume of the center speaker C is −infinity($\infty$) dB, the volume of the L-front speaker Lf is −infinity($\infty$) dB, the volume of the R-front speaker Rf is −12 dB, the volume of the L-surround speaker Ls is −infinity($\infty$) dB and the volume of the R-surround speaker Rs is −28 dB.

As described above, processing calculating the volumes of the five speakers 64a is performed for each of the sound sources being arranged. Then, if the volume of each of the speakers 64a is calculated for each sound source, the volumes of each of the speakers 64a for each sound source are composed. In this embodiment, for each of the speakers 64a, a component with the largest volume is selected among the sounds output from each sound source, and the sound data for outputting the sound of the selected component with the largest sound volume to the respective speakers 64a is generated.

On an example that four (4) sound sources are arranged, a method of composing volumes for each speaker for respective sound sources will be described. As shown in FIG. 12A, FIG. 12B, FIG. 12C and FIG. 12D, four sound sources are arranged to listeners. However, in FIG. 12A-FIG. 12D, a positional relationship between the listener and each of the four sound sources is illustrated separately.

As shown in FIG. 12A-FIG. 12D, the four sound sources are arranged outside the determination circle DC, respectively. Therefore, as shown in FIG. 12E, FIG. 12F, FIG. 12G and FIG. 12H, a volume of the sound that is output from each sound source is calculated for the selected two speakers 64a as described with referring to FIG. 11B, and a minimum value (−infinity) is set for each of the non-selected three speakers 64a.

In case of the sound source shown in FIG. 12A, the center speaker C and the L-front speaker Lf that are arranged on both sides across a line segment connecting the listener and the sound source, and with a short distance to the line segment are selected, and the volumes thereof are calculated based on the distances to the sound source. For example, as shown in FIG. 12E, the volume of the center speaker C is −40 dB, and the volume of the L-front speaker Lf is −12 dB.

Moreover, in case of the sound source shown in FIG. 12B, the center speaker C and the L-front speaker Lf are selected, like the case of FIG. 12A, and the volumes are calculated based on the distances to the sound source. For example, as shown in FIG. 12F, the volume of the center speaker C is −16 dB, and the volume of the L-front speaker Lf is −10 dB.

Furthermore, in case of the sound source shown in FIG. 12C, the R-front speaker Rf and the R-surround speaker Rs that are arranged on both sides across a line segment connecting the listener and the sound source, and with a short distance to the line segment are selected, and the volumes thereof are calculated based on the distances with the sound source. For example, as shown in FIG. 12G, the volume of the R-front speaker Rf is −5 dB, and the volume of the R-surround speaker Rs is −20 dB.

Furthermore, in case of the sound source shown in FIG. 12D, the R-surround speaker Rs and the L-surround speaker L-surround Ls that are arranged on both sides across a line segment connecting the listener and the sound source, and with a short distance to the line segment are selected, and the volumes thereof are calculated based on the distances with the sound source. For example, as shown in FIG. 12H, the volume of the L-surround speaker Ls is −42 dB, and the volume of the R-surround speaker Rs is −6 dB.

Thus, when the volumes of the sounds output from the respective sound sources are calculated for each speaker, those calculation results are composed. In this embodiment, as described above, for each of the speakers 64a, a component having the largest volume among the sounds output from each of the sound sources is selected, and the sound data for outputting the sound of the selected component with the largest sound volume to the respective speakers 64a are generated.

Specifically, as understood by comparing FIG. 12E-FIG. 12H, as for the center speaker C, the volume shown in FIG. 12F is the largest, and therefore, the sound to be output from the sound source shown in FIG. 12B of this volume is selected. As for the L-front speaker Lf, the volume shown in FIG. 12F is also the largest, and the sound to be output from the sound source shown in FIG. 12B of this volume is selected. As for the R-front speaker Rf, the volume shown in FIG. 12G is the largest, and the sound to be output from the sound source shown in FIG. 12C of this volume is selected. As for the L-surround speaker Ls, the volume shown in FIG. 12H is the largest, and the sound to be output from the sound source shown in FIG. 12D of this volume is selected. As for the R-surround speaker Rs, the volume shown in FIG. 12H is the largest, and the sound to be output from the sound source shown in FIG. 12D of this volume is selected.

Therefore, as shown in FIG. 12I, the sound and volume of each of the speakers 64a are selected. However, in FIG. 12I, only the volume is displayed near the alphabetical letter indicating each speaker 64a. Then, as to each of the speakers 64a, the sound data is generated in order to reproduce the selected sound with the calculated volume.

In addition to the environmental sound based on the terrain data, a base noise is reproduced in this embodiment. The base noise is another environmental sound that can be heard from a predetermined direction unlike the environmental sound based on the terrain data. For example, this base noise is a noise that is heard from a place far away from a position (place) where the player character 202 exists (for example, a neighboring city), a convective sound of air, reverberation of various sounds that generated in the past, and even when the environmental sound based on the terrain data is not reproduced in the range R, the sound can be heard by the player character 202 out of doors.

Figure 13A:
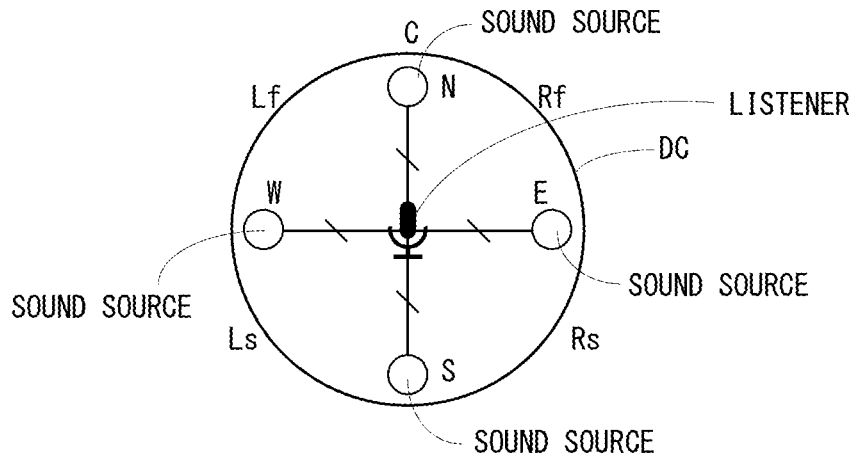
FIG. 13A is an illustration view showing a non-limiting example volumes when outputting sounds generated by a base noise from respective speakers in case the listener is facing north.

In this embodiment, as shown in FIG. 13A, predetermined directions are four (4) directions (azimuths) of north, south, east and west set in the virtual space. Moreover, a sound source that generates a kind of base noise corresponding to a current position of the player character 202 is arranged while maintaining a predetermined distance from the listener (player character 202). The predetermined distance is set shorter than a radius r2 of the determination circle DC, and base noises in the respective directions are reproduced from the five speakers 64a. However, the volume of each speaker 64a is attenuated in proportion to a distance with the sound source generating the base noise.

Moreover, in the example shown in FIG. 13A, an upward direction is for the north (N), a leftward direction is for the west (W), a downward direction is for the south (S) and a rightward direction is for the east (E). In FIG. 13A, since the listener is facing upward, the virtual center speaker C is arranged in the north side. The arrangement of other four (4) speakers 64a (Lf, Rf, Ls, Rs) is also determined, as described above, along the determination circle DC on the basis of the position and the direction of the listener.

Figure 13B:
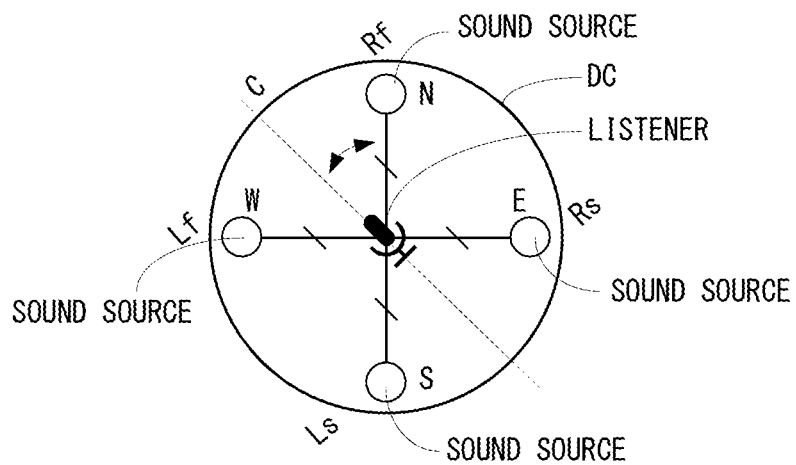
FIG. 13B is an illustration view showing a non-limiting example volumes when outputting sounds generated by a base noise from respective speakers in case the listener is facing northwest.

In addition, when calculating a volume of the base noise for each of the speakers 64a, as shown in FIG. 13A and FIG. 13B, alphabetical letters representing the respective speakers 64a are indicated outside the determination circle DC, and it is assumed that the respective virtual speakers 64a are arranged at those positions.

Although a sound source of the base noise moves in conjunction with a movement of the listener (player character 202), since an arranging direction (azimuth) thereof is fixed, even if the direction of the player character 202 is changed, the direction with respect to the player character 202 does not change. Therefore, even when the listener (player character 202) faces the northwest as shown in FIG. 13B, as shown in FIG. 13A, four (4) sound sources of the base noise are fixedly arranged in the directions of north, south, east and west while keeping a distance with the listener constant. However, since the listener is facing the northwest, the center speaker C is arranged at the northwest side. Arrangement of other four (4) speakers 64a (Lf, Rf, Ls, Rs) is determined, as described above, along the determination circle DC on the basis of the position and the direction of the listener.

Thus, a plurality of sound sources of the base noise are arranged, and therefore, the environmental sound (base noise) from the sound sources of the base noise is output from the respective speakers 64a together with the environmental sound based on the terrain. Moreover, a base noise can be heard even in a scene does not have the environmental sound based on the terrain. Therefore, it is possible to express an atmosphere or/and a spread of a whole sound space by changing a tone of the base noise or/and the volume of each speaker 64a. Moreover, by outputting the base noise, it is also possible to express a convection sound of air or/and matters like residue of reverberation energy of various sounds having been ringing in the past. Therefore, the environmental sound in the virtual space can be brought closer to the environmental sound in a real space.

In addition, in this embodiment, although the sound source of the base noise is arranged to each of four azimuths, it does not need to be limited to this. For example, a sound source of the base noise may be arranged in each of eight azimuths including northwest, southwest, northeast and southeast in addition to the north, south, east and west. Moreover, a sound source of the base noise may be arranged not only a horizontal direction to the listener but a vertical direction to the listener. That is, a plurality of sound sources of the base noises may be arranged along a spherical surface centered on the listener. This makes it possible to reproduce (generate) the base noise that can be heard from above (overhead) or/and below (under the foot) with respect to the listener in ground (underground) or underwater.

Moreover, a tone of the base noise can be changed according to whether the listener exists outdoors or indoors. When the listener is in the outdoors, the tone can be further changed according to a place thereof. For example, if the listener exists near the water, a base noise such as a splashing sound or/and a reverberation component of the running water sound is reproduced. Moreover, when the listener is in a drying zone such as a desert, it sounds a base noise like sand is flying.

Furthermore, the base noise can also change a tone according to various elements, such as not only the place the listener exists but the weather, temperature, atmospheric pressure, etc.

Moreover, instead of or in addition to the tone, the base noise may change in a pitch, volume, frequency, a reverberant sound, etc.

As described above, the environmental sound based on the terrain in the virtual space is output from the respective speakers 64a with appropriate volumes, and furthermore, the base noise is output from the respective speakers 64a with appropriate volumes, whereby the sound accompanying a spread of an acoustic space and reality can be heard.

In addition, when the player character 202 is moved, the range R is also moved. Since a single grid has the length and the width of 5 meters, respectively, when the player character 202 is moved a distance of 5 meters or more horizontally or vertically, the range R is moved (updated) and the arrangement position candidates for sound source are updated, and the sound source to be arranged is also updated. However, when the player character 202 is moved in an oblique direction, the range R etc. are also updated if a moving distance in vertical or horizontal exceeds 5 meters.

Moreover, although the range R is determined based on the position of the player character 202 and the arrangement of the arrangement position candidates for sound source and the sound source is performed in this embodiment, the arrangement position candidates for sound source are calculated and stored in advance for a whole map based on the terrain, and when the range R is determined, the arrangement position candidates for sound source in the range R concerned may be read out. In such a case, a memory for storing in advance the arrangement position candidates for sound source of the whole map may be the internal memory (flash memory 24) of the game apparatus 10 or an external computer communicably connected with the game apparatus 10.

Figure 14:
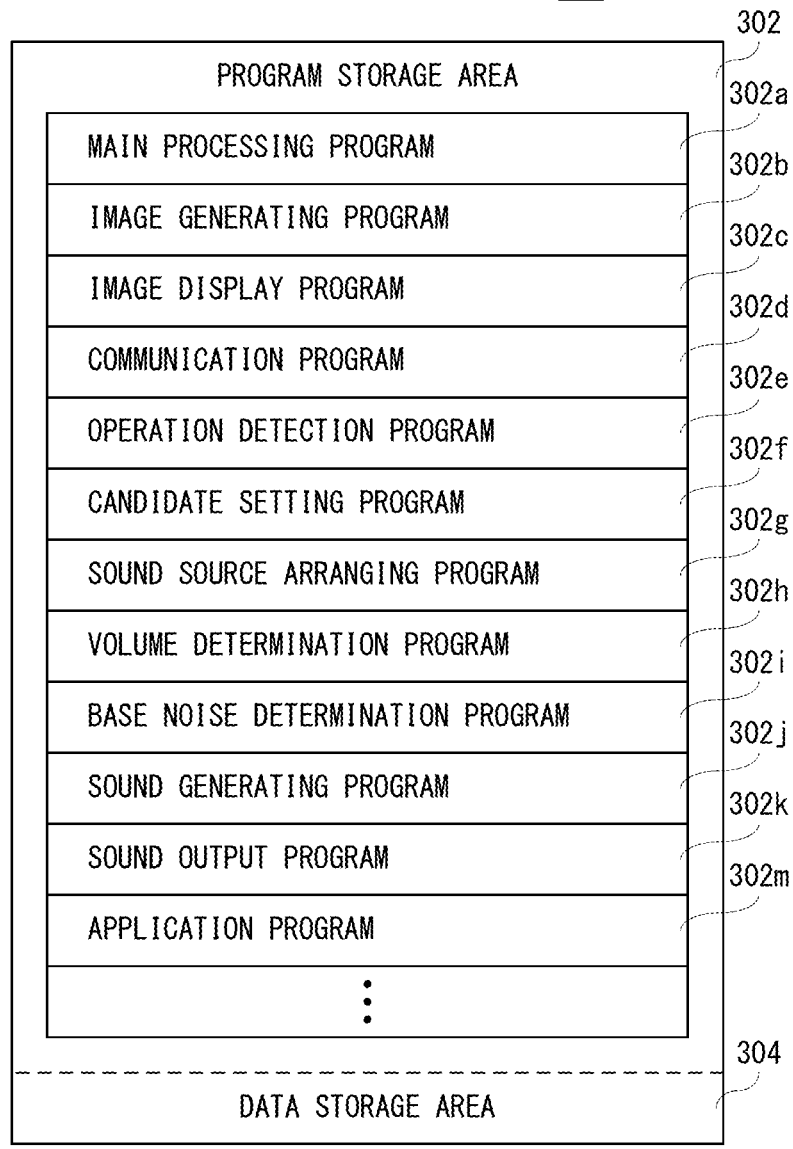
FIG. 14 is an illustration view showing a non limiting example memory map of a RAM shown in FIG. 3.

FIG. 14 is an illustration view showing a non-limiting example memory map 300 of the RAM 22 of the main body unit 10a shown in FIG. 3. As shown in FIG. 14, the RAM 22 includes a program storage area 302 and a data storage area 304. The program storage area 302 is stored with main processing program 302a, an image generating program 302b, an image display program 302c, a communication program 302d, an operation detection program 302e, a candidate setting program 302f, a sound source arranging program 302g, a volume determination program 302h, a base noise determination program 302i, a sound generating program 302j, a sound output program 302k, an application programs 302m, etc.

The main processing program 302a is a program (operating system) for processing a main routine of an operation of the game apparatus 10. The image generating program 302b is a program for generating image data corresponding to a screen such as the game screen 200 using image generation data 304b including data of polygon data, texture data, etc. The image display program 302c is a program for outputting the image data generated according to the image generating program 302b to the display 12 or the charge stand 50 through the bottom terminal 34.

The communication program 302d is a program for performing transmission and reception of data to or from (communication with) the first controller 14 and the second controller 16, respectively. The operation detection program 302e is a program for detecting operation data from the first controller 14 and the second controller 16, and storing the same to an operation data buffer 304a. However, information capable of identifying the first controller 14 and the second controller 16 individually is added to the operation data transmitted from each of the first controller 14 and the second controller 16.

The candidate setting program 302f is a program for determining the range R based on the position of the listener, i.e., the current position of the player character 202, and setting the arrangement position candidates for sound source while checking the terrain data in the range R in the shape of lattice. The sound source arranging program 302g is a program for selecting the arrangement position candidate for sound source being the forefront to the listener from the arrangement position candidates for sound source, and arranging a virtual sound source(s) at the selected arrangement position(s). However, in the virtual space, the sound source based on the terrain is not actually arranged.

The volume determination program 302h is a program for calculating the volume of the sound to be output from each of the sound sources based on the terrain data in case of arrangement in the virtual space for each of the speakers 64a, and composing the volumes of the speakers 64a of the sound output from the respective sound sources. The base noise determination program 302i is a program for calculating (determining) the volume of the base noise to be output from each of the sound sources of the base noise in case of arrangement in the virtual space for each of the speakers 64a in accordance with the direction of the listener. However, the environmental sound data 304c of the base noise is prepared in advance for every scene, and is selectively used according to the position of the listener, for example.

The sound generating program 302j is a program for generating, using environmental sound data 304c, the stereophonic sound data or the sound data to be output to the plurality of speakers 64 that constitute the 5.1ch surround system. Although detailed description is omitted, when generating the stereophonic sound data, the sound generating program 302j may calculate the volume for each speaker as similar to a case where the sound data are generated for the 5.1ch surround system by arranging two virtual speakers so as to constitute a stereophonic space in the virtual space. However, in such a case, since the two speakers are used, it is possible to perform selection of the speakers with a method other than a method using the determination circle DC.

The sound output program 302k is a program for outputting the sound data generated according to the sound generating program 302j to the speakers (the left speaker 36a and the right speaker 36b) provided on the main body unit 10a or to the charge stand 50 through the bottom terminal 34.

The application program 302m is a game program (program of the whole game processing) in this embodiment, but there is an occasion that a program for another application is stored.

In addition, the program storage area 302 is further stored with a save program for saving various kinds of data such as game data, etc. into the flash memory 24, etc.

Figure 15:
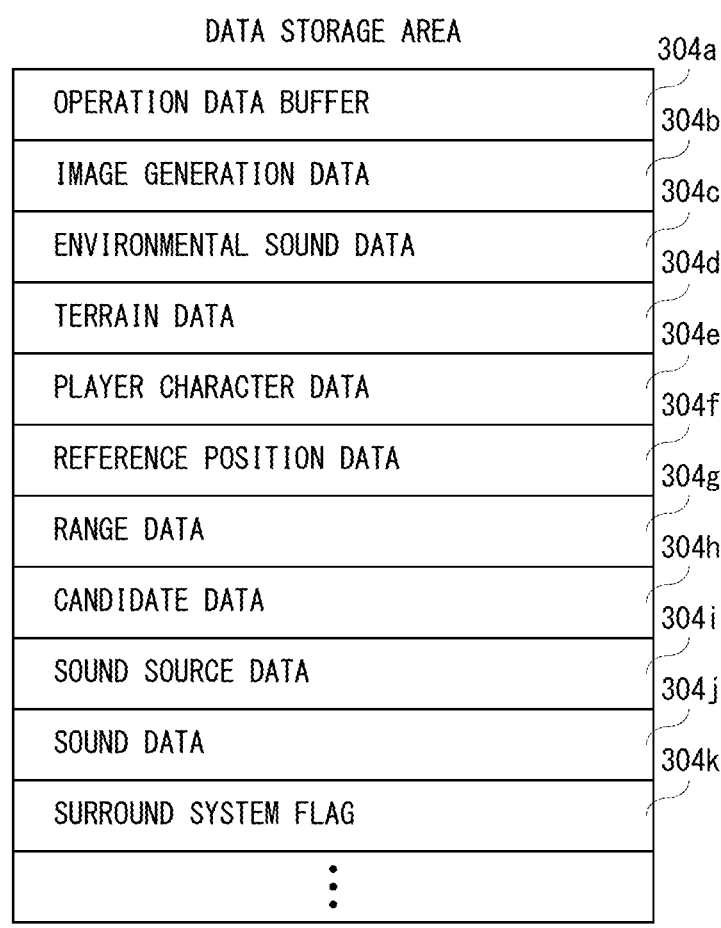
FIG. 15 is an illustration view showing a non-limiting example specific contents of a data storage in the RAM shown in FIG. 14.

FIG. 15 is an illustration view showing a non-limiting example specific content of the data storage area 304 shown in FIG. 14.

The data storage area 304 is provided with an operation data buffer 304a. Moreover, the data storage area 304 is stored with the image generation data 304b, the environmental sound data 304c, the terrain data 304d, the player character data 304e, the listening point data 304f, the range data 304g, the sound data 304h, the sound data 304i, the sound data 304j, etc.

The operation data buffer 304a is stored with the operation data detected by the operation detection program 302e in a time series. The image generation data 304b is data of the polygon data, the texture data, etc. for generating the image data corresponding to the image (screen) to be displayed on the display 12 or the television receiver 60.

The environmental sound data 304c is sound waveform data and the volume data for various kinds of environmental sounds. For example, when the environmental sound based on the terrain is the sound of a river, sound waveform data and volume data on sounds of rivers with a high flow velocity and sound waveform data and volume data on sounds of rivers with a low flow velocity are stored. When the environmental sound is the sound of the sea (or the lake), the sound waveform data and the volume data on the sound of rough waves and the sound waveform data and the volume data on the sound of calm waves are stored. Furthermore, when the environmental sound is the sound of a grassland, the sound waveform data and the volume data on the sound that a grass flower with long length flutters in a wind, and the sound waveform data and the volume on the sound that a grass flower with short length flutters in a wind are stored. Although detailed description is omitted, the same may be applied to the environmental sound based on other terrains. Moreover, the sound waveform data and the volume data on the environmental sound of the base noise are also stored. However, since the environmental sound of the base noise may be changed according to a scene (place), a plurality of kinds of sound waveform data and volume data according to places are prepared.

The terrain data 304d is data about the height of the ground and the attribute of the ground. Moreover, when the attribute of the ground is a water field, the data about the height of the water surface, the flow velocity and the kind of water are further included. Furthermore, when the attribute of the ground is grassland, the data about the length of the grass flower is also included.

The player character data 304e is the current position, the current direction and possession item of the player character 202. The listening point data 304f is data about the position and the direction of the listener.

The range data 304g is data about the range R that the listener is able to hear sound. In this embodiment, the range R is set to be a square having vertical and horizontal lengths of 160 meters in the virtual space, centered on the position of the listener. The candidate data 304h is data on the arrangement position candidates for sound source set based on the terrain data 304d in the range R defined according to the range data 304g. The sound source data 304i is data about the arrangement position that the sound source is arranged.

The sound data 304j is sound data that is generated base on a result composition of the volumes for each of the speakers 64a of the sound output from the sound sources indicated by the sound source data 304*i*, and is to be output to the respective speakers 64*a*.

Moreover, a surround system flag 304*k* is provided in the data storage area 304. The surround system flag 304*k* is a flag for determining whether the sound data for 5.1ch surround system is to be generated. For example, when generating the sound data for a 5.1ch surround system, the surround system flag 304*k* is turned on, and when the sound data for the 5.1ch surround system is not to be generated, the surround system flag 304*k* is turned off. It is set in advance by the player or user whether the sound data of 5.1ch surround system is to be generated. However, it is possible to set to generate the sound data of the 5.1ch surround system only when the game apparatus 10 (main body unit 10*a*) is put on the charging base 50. Moreover, when not generating the sound data of 5.1ch surround system, the stereophonic sound data is generated.

Although illustration is omitted, the data storage area 304 is stored with data required for execution of the main processing program 302*a* and the application program 302*m*, and is provided with other flags and counters (timer(s)).

Figure 16:
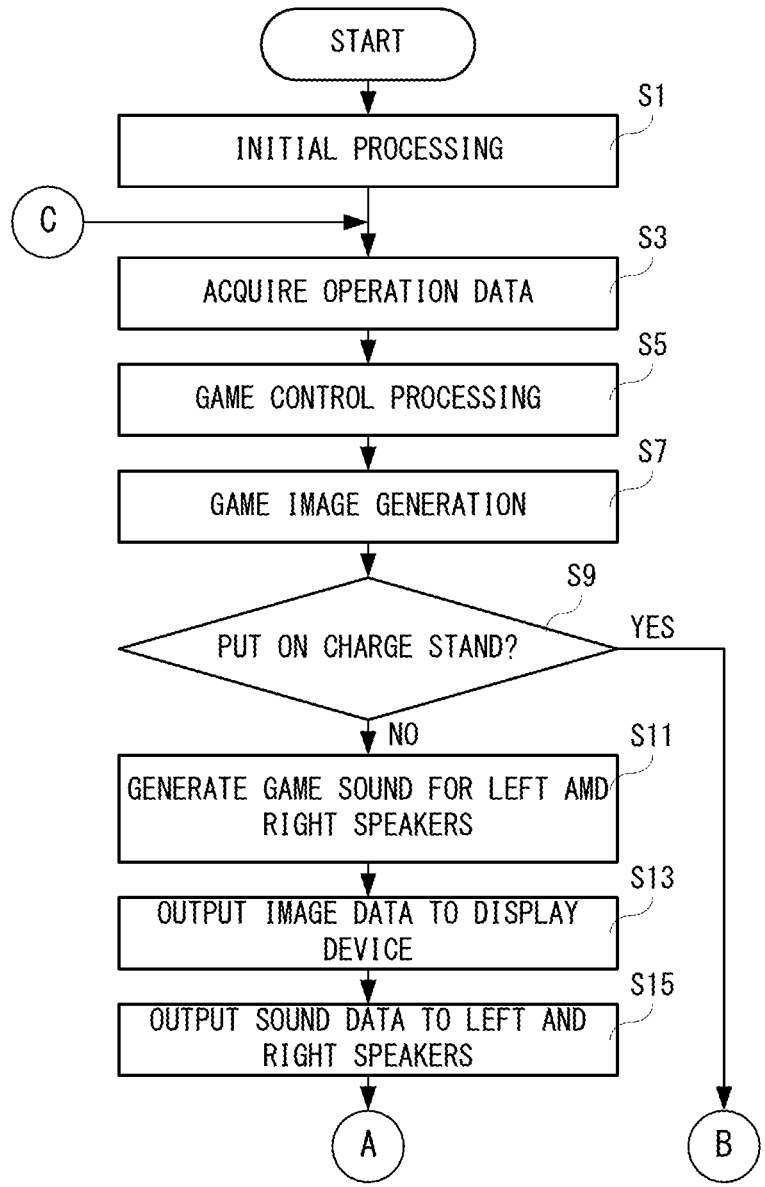
FIG. 16 is a flow chart showing a part of non-limiting example whole game processing of a processor shown in FIG. 3.
Figure 17:
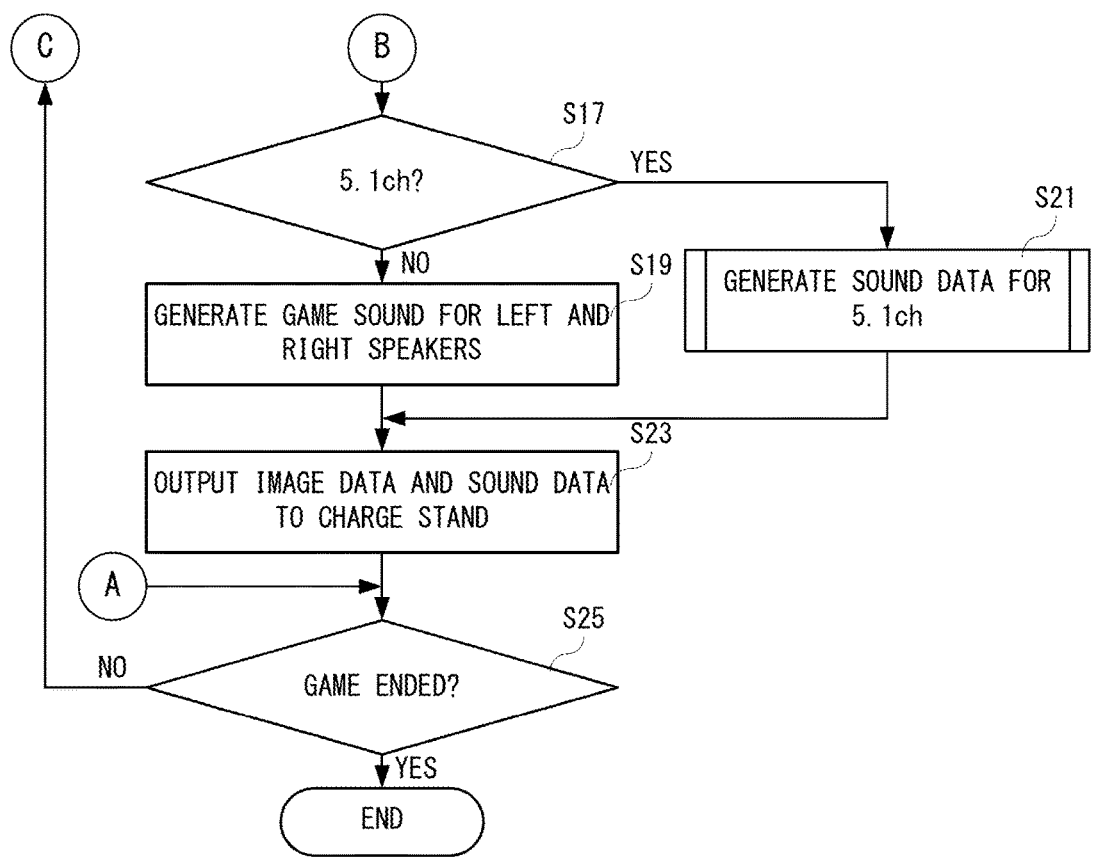
FIG. 17 is a flow chart showing another part of the non-limiting example whole game processing of the processor shown in FIG. 3, following FIG. 16.

FIG. 16 and FIG. 17 are flow charts showing a non-limiting example whole game processing of the processor 20 provided in the main body unit 10*a* shown in FIG. 3. It should be noted that the processing in each of respective steps of the flowchart shown in FIG. 16 and FIG. 17 (also in FIG. 18 and FIG. 19 described later) is a mere example, and if a similar result can be obtained, a processing order of the respective steps may be changed. Moreover, although this embodiment will be explained on a case where the processing of each of the respective steps of the flow charts shown in FIG. 16-FIG. 19 are basically performed by the processor 20, processors other than the processor 20 or dedicated circuits may be made to perform a part of the steps.

If the power supply of the game apparatus 10 is turned on, prior to execution of the whole game processing, the processor 20 executes a boot program stored in a boot ROM not shown, whereby respective components (units) such as the RAM 22, etc. can be initialized. Then, an application program (here, game program) is read into the RAM 22, and execution of the game program concerned is started by the processor 20.

As shown in FIG. 16, if the whole game processing is started, the processor 20 performs initial processing in a step S1. In the initial processing, the processor 20 is, for example, constructs a virtual space for generating and displaying the game screen 200, and arranges respective character objects such as the player character 202, etc. appearing in this virtual space at their initial positions, and at predetermined positions in the virtual space arranges the background objects 204. Furthermore, the processor 20 performs processing such as setting initial values of the various parameters used by the game processing.

In a next step S3, the operation data that is transmitted from the first controller 14 or/and the second controller 16 is acquired, and game control processing is performed in a step S5. For example, according to the operation data, the processor 20 moves the player character 202 or/and makes the player character 202 perform an arbitrary action. At this time, the player character data 304*e* is updated, and according to the position and the direction of the player character 202, the listening point data 304*f* is updated. Moreover, irrespective of (without) the operation data, the processor 20 moves an enemy character or/and make the enemy character perform an arbitrary action. Furthermore, the processor 20 determines the victory or defeat or ranking of the player character 202, or/and determines a game clear or game over.

Subsequently, in a step S7, the game image is generated based on a result of the game control processing in the step S5. That is, the processor 20 generates the image data corresponding to the game screen 200 as shown in FIG. 7 using the image generation data 304*b*. Then, it is determined in a step S9 whether the main body unit 10*a* (game apparatus 10) is put on the charge stand 50. Here, the processor 20 confirms whether it is possible to perform communication with the charge stand 50.

If "YES" is determined in the step S9, that is, if the main body unit 10*a* is put on the charge stand 50, the process proceeds to a step S17 shown in FIG. 17. On the other hand, if "NO" is determined step S9, that is, if the main body unit 10*a* is not put on the charge stand 50, the game sound for left and right speakers is generated in a step S11. Here, the processor 20 generates the sound data for the left speaker 36*a* and the sound data for the right speaker 36*b* (stereophonic sound data) using the environmental sound data 304*c* based on a result of the game control processing of the step S5.

Subsequently, the image data generated in the step S7 is output to the display 12 in a step S13, and in a step S15, the sound data generated in the step S11 is output to the left speaker 36*a* and the right speaker 36*b* through the codec circuit 32, and the process proceeds to a step S25 shown in FIG. 17.

As shown in FIG. 17, in the step S17, it is determined whether it is 5.1ch. Here, the processor 20 determines whether the surround system flag 304*k* is turned on.

If "NO" is determined in the step S17, that is, if it is not 5.1ch, the game sound for left and right speakers is generated, and the process proceeds to a step S23. Processing of this step S19 is the same as the above-described step S11. On the other hand, if "YES" is determined in the step S17, that is, if it is 5.1ch, generating processing of the sound data for 5.1ch described later (refer to FIG. 18 and FIG. 19) is performed in a step S21, and the process proceeds to a step S23.

In the step S23, the image data generated in the step S7 and the sound data generated in the step S19 or the step S21 are output to the charge stand 50 through the bottom terminal 34. However, the sound data generated in the step S21 includes the environmental sound based on the terrain (terrain data) and the sound data based on the base noise.

Therefore, when the charge stand 50 is connected to the television receiver 60 through the AV amplifier 62, the image data and the sound data (AV data) are input to the AV amplifier 62 connected to the charge stand 50, the image data is output to the television receiver 60 connected to the AV amplifier 62, and the sound data is output to the plurality of speakers 64 connected to the AV amplifier 62. Moreover, when the charge stand 50 is directly connected to the television receiver 60, the AV data is output to the television receiver 60 from the charge stand 50. Therefore, a screen such the game screen 200 is displayed on the monitor of the television receiver 60, and the game sound is output from the plurality of speakers 64 constituting the 5.1ch surround system or the speaker of the television receiver 60.

Then, it is determined whether the game is to be ended in a step S25. Determination in the step S25 is performed according to whether it becomes the game over, or whether an instruction to stop the game is input by the player, for example. If "NO" is determined in the step S25, that is, if the game is not to be ended, the process returns to the step S3 shown in FIG. 16. On the other hand, if "YES" is determined in the step S25, that is, if the game is to be ended, the whole game processing is terminated.

Figure 18:
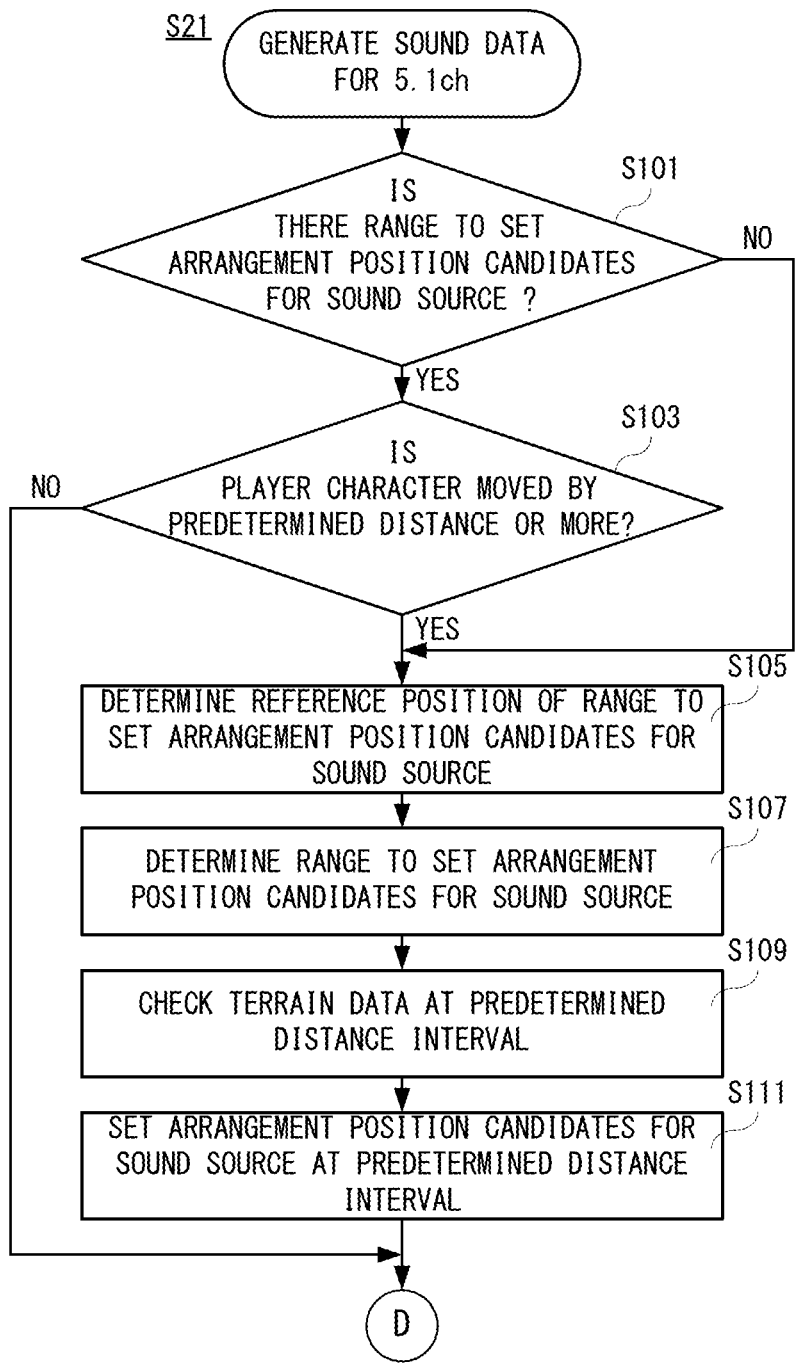
FIG. 18 is a flow chart showing a part of non-limiting example 5.1ch sound data generation processing of the processor shown in FIG. 3.
Figure 19:
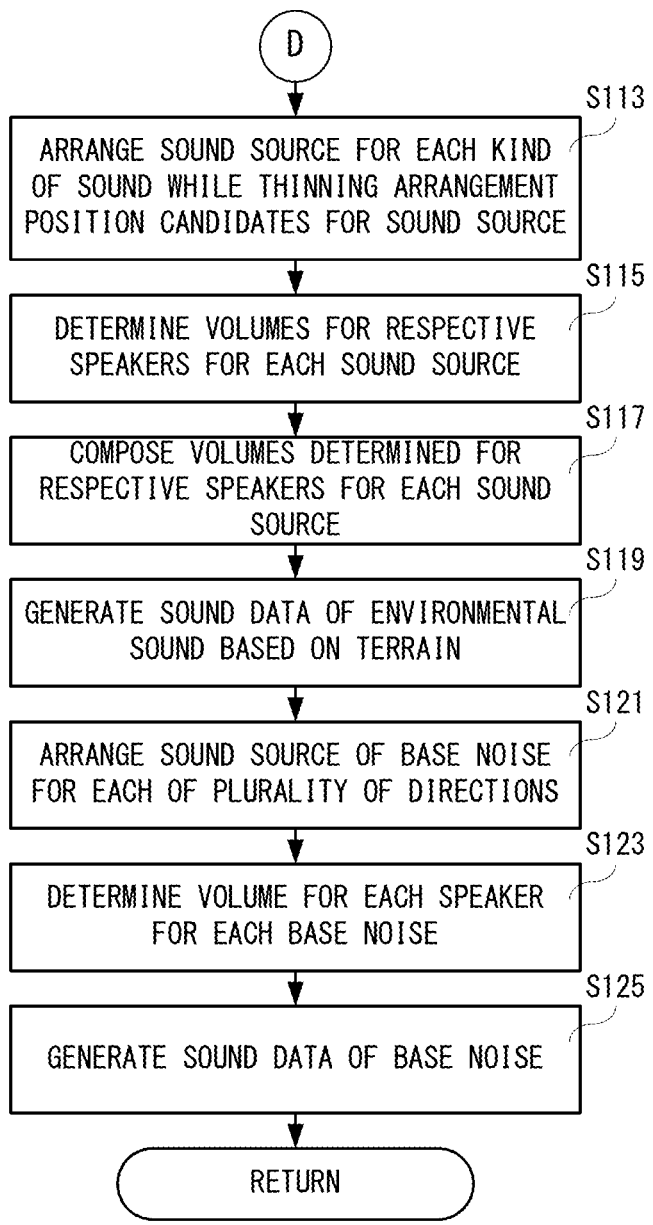
FIG. 19 is a flow chart showing another part of the non-limiting example 5.1ch sound data generation processing of the processor shown in FIG. 3, following FIG. 18.

FIG. 18 and FIG. 19 are flow charts showing a non-limiting example 5.1ch sound data generation processing in the step S21 shown in FIG. 17. As shown in FIG. 18, when the 5.1ch sound data generation processing is started, the processor 20 determines in a step S101 whether the range R for setting the arrangement position candidates for sound source is determined. Here, the processor 20 determines whether the range data 304g is stored in the data storage area 304.

If "NO" is determined in the step S101, that is, if the range R is not determined, the process proceeds to a step S105. On the other hand, if "YES" is determined in the step S101, that is, if the range R is determined, it is determined in a step S103 whether the player character 202 is by a predetermined distance (it is 5 meters to the X-axis direction or the Y-axis direction, for example, in the virtual space) or more.

If "NO" is determined in the step S103, that is, if the player character 202 is not moved by the predetermined distance or more, since it is unnecessary to update the range R, the process proceeds to a step S113 shown in FIG. 19. On the other hand, if "YES" is determined in the step S103, that is, if the player character 202 is moved by the predetermined distance or more, since it is necessary to update the range R, the process proceeds to a step S105.

In step S105, the current position of the player character 202 is determined as a reference position (in this embodiment, the listening point P) of the range that the arrangement position candidates for sound source. Here, the processor 20 determines the position ignoring the coordinate in the Z axis direction (height direction) from the current position of the player character 202 as the listening point P, and stores (updates) the data on the XY coordinate of the listening point P as the listening point data 304f in the data storage area 304.

In a subsequent step S107, the range R that the arrangement position candidates for sound source are to be set is determined, and the terrain data is checked with the intervals of a predetermined distance in the range R in a step S109. Next, in a step S111, in the range R, a plurality of arrangement position candidates for sound source are set at the interval of the predetermined distance, and the process proceeds to the step S113.

As shown in FIG. 19, in the step S113, for each kind of the environmental sound, some arrangement position candidates for sound source are thinned out, that is, a part of arrangement positions for sound source are selected from the plurality of arrangement position candidates for sound source, and virtual sound sources are arranged at the selected arrangement positions for sound source. As described above, the processor 20 selects (determines), for each kind of the environmental sound, some arrangement position candidates for sound source being the forefront to the listener from the plurality of arrangement position candidates for sound source as the arrangement positions for sound source.

In a next step S115, as for each of the sound sources arranged in the step S113, the volumes for the plurality of virtual speakers 64a are determined (calculated) according to the position and the direction of the listening point P (listener). At this time, the volume of the sound output from the sound source is attenuated according to the distance between the sound source and each of the speakers 64a. However, when the sound source is arranged outside the determination circle DC, the volumes for two speakers 64a that are arranged on both sides across a line segment connecting the listener and the sound source, and with a short distance to the line segment are calculated, and a smallest value is set for volume of each of the remaining three speakers 64a.

Then, in a step S117, the volumes of the respective speakers 64a determined for each sound source are composed, and the sound and the volume of the environmental sound that is based on the terrain and to be output from each speaker 64a are determined. In this step S117, the processor 20 selects, for each of the speakers 64a, the component with the largest volume among the sounds output from each of the sound sources.

In a next step S119, the sound data of the environmental sound based on the terrain. Here, the processor 20 generates the sound data for outputting to each of the speakers 64a the sound of the component with the largest volume selected in the step S117.

Subsequently, in a step S121, the sound sources of the base noise are arranged to each of a plurality of predetermined directions (in this embodiment, north, south, east and west). In a next step S123, for each base noise, the volume of each of the plurality of speakers 64a arranged according to the position and the direction of the listener is determined (calculated), and in a step S125, the sound data of each speaker 64 a is generated, and then, the process returns to the whole game processing.

However, in this step S119, the processor 20 selects the sound data to be output to the subwoofer LFE from the environmental sound data stored in advance according to the position of the listener (listening point P) (scene) in the virtual space irrespective of the environmental sound based on the terrain data and the base noise.

Moreover, although illustration is omitted, in the generation processing of the sound data for 5.1ch, the sound data about sounds other than the environmental sound is also generated.

According to this embodiment, since the sound source is determined based on the terrain, the sound source can be appropriately arranged only by making the terrain. Therefore, it is possible to improve the work efficiency.

Moreover, according to this embodiment, since the sound source is arranged at the position according to the terrain in virtual space and the sound can be heard from this sound source, it is possible to obtain realistic acoustic effects.

Furthermore, according to this embodiment, since the base noise from the predetermined direction can also be heard, both the environmental sound based on the terrain and the environmental sound from the predetermined direction can be reproduced, it is possible to obtain more realistic acoustic effect.

In addition, although the listening point is set to the position of the player character in this embodiment, it does not need to be limited to this. For example, the listening point may be set to the position of the virtual camera. Normally, the virtual camera is moved so as to keep a predetermined positional relationship with the player character. Therefore, even when the listening point is set to the position of the virtual camera, it is possible to say that the listening point is set based on the position of the player character.

Moreover, although the 5.1ch surround system is constituted in this embodiment, another kind of surround system, such as 2.1ch, 3.1ch, or 7.1ch may be constituted, for example. In case where the other kind of surround system is constituted, when calculating the volume in the above-described embodiment, the number and the arrangement position of the virtual speakers to be arranged in the virtual space. However, two subwoofers LFE may be used.

In addition, the content of the game, the structure of the game apparatus and the specific numerical values are mere exemplification, and should not be limited, and can be changed suitably according to actual products.

Although certain example systems, methods, storage media, devices and apparatuses have been described herein, it is to be understood that the appended claims are not to be limited to the systems, methods, storage media, devices and apparatuses disclosed, but on the contrary, are intended to cover various modifications and equivalent arrangements included within the spirit and scope of the appended claims.

What is claimed is:

1. A system, comprising:
storage memory storing at least one executable program; and
a processing system, including at least one processor coupled to the storage memory and configured to execute the executable program so that the processing system is configured to at least perform:
a listening position control to control, in a virtual space, a position and a direction of a virtual listening point;
a terrain object arrangement to arrange a terrain object in the virtual space;
a virtual sound source arrangement to arrange a plurality of virtual sound sources within a range that the terrain object satisfies a predetermined condition;
a volume calculation to calculate volumes of sounds to be output to a plurality of sound output destinations, respectively, based on a positional relationship between the plurality of virtual sound sources and the virtual listening point; and
a sound output to output sounds to the plurality of sound output destinations with the volumes of sounds calculated by the volume calculation.

2. The system according to the claim 1, wherein the virtual sound source arrangement is configured to set within the range a plurality of arrangement points to which plurality of virtual sound sources are to be arranged, and further to arrange the virtual sound sources on some arrangement points that are selected among the plurality of arrangement points based on distances from the virtual listening points.

3. The system according to the claim 2, wherein the virtual sound source arrangement is configured to set within the range the arrangement points for every predetermined interval, and to select the some arrangement points being a nearest side viewed from the virtual listening point out of the arrangement points.

4. The system according to the claim 3, wherein the virtual sound sources include different kinds of virtual sound sources, and
the virtual sound source arrangement is configured to set for each kind a plurality of arrangement points for arranging a plurality of virtual sound sources within the range, and further to arrange the virtual sound sources at some arrangement points selected among the plurality of arrangement points based on distances from the virtual listening points.

5. The system according to the claim 3, wherein
the volume calculation is configured to calculate the volume of the sound that is output from the virtual sound source with respect to the plurality of sound output destinations according to the distances between the virtual sound sources and the plurality of sound output destinations while making the direction to the virtual listening point associate with each of the plurality of sound output destinations, and further to select a largest volume component out of calculated sounds that are output from the virtual sound sources for each of the plurality of sound output destinations, and
the sound output is configured to output the sound to the respective sound output destinations with the largest volume component being selected.

6. The system according to the claim 1, wherein:
the processing system is further configured to at least perform a fixed azimuth sound source arrangement to arrange a virtual sound source whose azimuth is fixed at a position with a predetermined distance from a position of the virtual listening point toward a predetermined azimuth within the virtual space,
the volume calculation is configured to calculate, for the virtual sound source whose azimuth is fixed, a volume of a sound according to distances with the plurality of sound output destinations corresponding to the directions with respect to the virtual listening point in the predetermined azimuth, and
the sound output is configured to output the sounds that are output from the virtual sound sources arranged within the range and a sound that is output from the virtual sound source whose azimuth is fixed.

7. The system according to the claim 1, wherein the processing system is further configured the sound output to output the sound associated with a kind of the terrain.

8. The system according to the claim 1, wherein:
the processing system is further configured to at least perform a player character control to control a player character in the virtual space based on an operation of a user,
the listening position control is configured to the position and the direction of the virtual listening point in conjunction with a position and a direction of the player character.

9. A sound processing apparatus, comprising:
a listening position control section configured to control, in a virtual space, a position and a direction of a virtual listening point;
a terrain object arranging section configured to arrange a terrain object in the virtual space;
a virtual sound source arranging section configured to arrange a plurality of virtual sound sources within a range that the terrain object satisfies a predetermined condition;
a volume calculation section configured to calculate volumes of sounds to be output to a plurality of sound output destinations, respectively, based on a positional relationship between the plurality of virtual sound sources and the virtual listening point; and
a sound output section configured to output sounds to the plurality of sound output destinations with the volumes of sounds calculated by the volume calculation section.

10. The sound processing apparatus according to the claim 9, wherein the virtual sound source arranging section is configured to set within the range a plurality of arrangement points to which plurality of virtual sound sources are to be arranged, and further to arrange the virtual sound sources on some arrangement points that are selected among the plurality of arrangement points based on distances from the virtual listening points.

11. The sound processing apparatus according to the claim 10, wherein the virtual sound source arranging section is configured to set within the range the arrangement points for every predetermined interval, and to select the some arrangement points being a nearest side viewed from the virtual listening point out of the arrangement points.

12. The sound processing apparatus according to the claim 11, wherein the virtual sound sources include different kinds of virtual sound sources, and the virtual sound source arranging section is configured to set for each kind a plurality of arrangement points for arranging a plurality of virtual sound sources within the range, and further to arrange the virtual sound sources at some arrangement points selected among the plurality of arrangement points based on distances from the virtual listening points.

13. The sound processing apparatus according to claim 11, wherein the volume calculation section is configured to calculate the volume of the sound that is output from the virtual sound source with respect to the plurality of sound output destinations according to the distances between the virtual sound sources and the plurality of sound output destinations while making the direction to the virtual listening point associate with each of the plurality of sound output destinations, and further to select a largest volume component out of calculated sounds that are output from the virtual sound sources for each of the plurality of sound output destinations, and the sound output section is configured to output the sound to the plurality sound output destinations with the largest volume component being selected.

14. A non-transitory computer-readable storage medium storing a sound processing program executable by a computer, wherein the sound processing program causes one or more processors of the computer to perform:

a listening position controlling step configured to control, in a virtual space, a position and a direction of a virtual listening point;

a terrain object arranging step configured to arrange a terrain object in the virtual space;

a virtual sound source arranging step configured to arrange a plurality of virtual sound sources within a range that the terrain object satisfies a predetermined condition;

a volume calculation step configured to calculate volumes of sounds to be output to a plurality of sound output destinations, respectively, based on a positional relationship between the plurality of virtual sound sources and the virtual listening point; and a sound output step configured to output sounds to the plurality of sound output destinations with the volumes of sounds calculated by the volume calculation step.

15. The non-transitory computer-readable storage medium according to the claim 14, wherein in the virtual sound source arranging step, a plurality of arrangement points to which plurality of virtual sound sources are to be arranged is set within the range, and further the virtual sound sources are arranged on some arrangement points that are selected among the plurality of arrangement points based on distances from the virtual listening points.

16. The non-transitory computer-readable storage medium according to the claim 15, wherein in the virtual sound source arranging step, the arrangement points for every predetermined interval, and to select the some arrangement points being a nearest side viewed from the virtual listening point out of the arrangement points are set within the range.

17. The non-transitory computer-readable storage medium according to the claim 16, wherein the virtual sound sources include different kinds of virtual sound sources, and in the virtual sound source arranging step, a plurality of arrangement points for arranging a plurality of virtual sound sources are set for each kind within the range, and further the virtual sound sources are at some arrangement points selected among the plurality of arrangement points based on distances from the virtual listening points.

18. The non-transitory computer-readable storage medium according to the claim 16, wherein in the volume calculation step, the volume of the sound that is output from the virtual sound source is calculated with respect to the plurality of sound output destinations according to the distances between the virtual sound sources and the plurality of sound output destinations while making the direction to the virtual listening point associate with each of the plurality of sound output destinations, and a largest volume component is selected out of calculated sounds that are output from the virtual sound sources for each of the plurality of sound output destinations, and in the sound output step, the sound with the largest volume component being selected is output to the respective sound output destination.

19. A sound processing method, comprising steps of:
(a) controlling, in a virtual space, a position and a direction of a virtual listening point;
(b) arranging a terrain object in the virtual space;
(c) arranging a plurality of virtual sound sources within a range that the terrain object satisfies a predetermined condition;
(d) calculating volumes of sounds to be output to a plurality of sound output destinations, respectively, based on a positional relationship between the plurality of virtual sound sources and the virtual listening point; and
(e) outputting sounds to the plurality of sound output destinations with the volumes of sounds calculated in the step (d).

20. The sound processing method according to the claim 19, wherein the step (c) is configured to set within the range a plurality of arrangement points to which plurality of virtual sound sources are to be arranged, and further to arrange the virtual sound sources on some arrangement points that are selected among the plurality of arrangement points based on distances from the virtual listening points.

21. The sound processing method according to the claim 20, wherein the step (c) is configured to set within the range the arrangement points for every predetermined interval, to select the some arrangement points being a nearest side viewed from the virtual listening point out of the arrangement points.

22. The sound processing method according to the claim 21, wherein the virtual sound sources include different kinds of virtual sound sources, and the step (c) is configured to set for each kind a plurality of arrangement points for arranging a plurality of virtual sound sources within the range, and further to arrange the virtual sound sources at some arrangement points selected among the plurality of arrangement points based on distances from the virtual listening points.

23. The sound processing method according to the claim 21, wherein the step (d) is configured to calculate the volume of the sound that is output from the virtual sound source with respect to the plurality of sound output destinations according to the distances between the virtual sound sources and the plurality of sound output destinations while making the direction to the virtual listening point associate with each of the plurality of sound output destinations, and further to select a largest volume component out of calculated sounds that are output from the virtual sound sources for each of the plurality of sound output destinations, and the step (e) is configured to output the sound to the respective sound output destinations with the largest volume component being selected.

\* \* \* \* \*